(12) United States Patent
Lee et al.

(10) Patent No.: US 11,252,553 B2
(45) Date of Patent: Feb. 15, 2022

(54) METHOD AND DEVICE FOR ESTABLISHING CONNECTION USING BLUETOOTH LOW ENERGY

(71) Applicant: LG Electronics Inc., Seoul (KR)

(72) Inventors: Minsoo Lee, Seoul (KR); Joonkie Kim, Seoul (KR); Hangyu Cho, Seoul (KR); Jingu Choi, Seoul (KR)

(73) Assignee: LG Electronics Inc., Seoul (KR)

(*) Notice: Subject to any disclaimer, the term of this patent is extended or adjusted under 35 U.S.C. 154(b) by 155 days.

(21) Appl. No.: 16/606,286

(22) PCT Filed: Apr. 20, 2018

(86) PCT No.: PCT/KR2018/004643
§ 371 (c)(1),
(2) Date: Oct. 18, 2019

(87) PCT Pub. No.: WO2018/194428
PCT Pub. Date: Oct. 25, 2018

(65) Prior Publication Data
US 2020/0100091 A1  Mar. 26, 2020

Related U.S. Application Data

(60) Provisional application No. 62/488,067, filed on Apr. 21, 2017.

(51) Int. Cl.
*H04W 8/00* (2009.01)
*H04W 76/14* (2018.01)
(Continued)

(52) U.S. Cl.
CPC ............. *H04W 8/005* (2013.01); *H04W 4/80* (2018.02); *H04W 40/246* (2013.01); *H04W 76/11* (2018.02); *H04W 76/14* (2018.02)

(58) Field of Classification Search
CPC ................................. H04W 4/80; H04W 8/005
See application file for complete search history.

(56) References Cited

U.S. PATENT DOCUMENTS

2015/0195673 A1* 7/2015 Rantapuska ............ H04L 67/16
455/3.05
2016/0007289 A1* 1/2016 Weizman .......... H04W 52/0229
370/311

(Continued)

FOREIGN PATENT DOCUMENTS

EP           3101874 A1    12/2016
KR   10-2016-0117970 A   10/2016
(Continued)

*Primary Examiner* — Wen W Huang
(74) *Attorney, Agent, or Firm* — Dentons US LLP

(57) ABSTRACT

Disclosed herein is a method for allowing a first device to be connected to a second device in a wireless communication system. The method includes performing a procedure for setting an advertising packet for providing a transport discovery service (TDS) and transmitting the set advertising packet to the second device, wherein the advertising packet comprises at least one advertising (AD) structure field, and one of the at least one AD structure field comprises a first length field, an AD type field indicating a type of data for providing the TDS, and an AD data field comprising TDS data for providing the TDS.

15 Claims, 19 Drawing Sheets

(51) Int. Cl.
*H04W 4/80* (2018.01)
*H04W 76/11* (2018.01)
*H04W 40/24* (2009.01)

(56) References Cited

U.S. PATENT DOCUMENTS

2016/0353233 A1* 12/2016 Yong ................ H04L 67/16
2017/0134609 A1* 5/2017 Park ................ G06Q 30/02
2017/0164163 A1* 6/2017 Lee ................ H04W 4/025
2017/0164186 A1* 6/2017 Yong ................ H04W 8/005
2017/0181063 A1* 6/2017 Kim ................ H04W 4/80
2017/0289787 A1* 10/2017 Yu ................ H04W 84/18
2018/0160394 A1* 6/2018 Reunamaki ........ H04W 64/00

FOREIGN PATENT DOCUMENTS

| WO | 2016/036206 A2 | 3/2016 |
| WO | 2016/167541 A1 | 10/2016 |
| WO | 2016/178542 A1 | 11/2016 |

* cited by examiner

Fig. 7

| OpCode | | total parameter length | parameter 0 | parameter 1 | ... |
|---|---|---|---|---|---|
| OCF | OGF | | | | |

(a) HCI command packet

| event code | total parameter length | parameter 0 | parameter 1 | ... |
|---|---|---|---|---|

(b) HCI event packet

METHOD AND DEVICE FOR ESTABLISHING CONNECTION USING BLUETOOTH LOW ENERGY

CROSS-REFERENCE TO RELATED APPLICATION

This application is the National Stage filing under 35 U.S.C. 371 of International Application No. PCT/KR2018/004643, filed on Apr. 20, 2018, which claims the benefit of U.S. Provisional Application No. 62/488,067, filed on Apr. 21, 2017, the contents of which are all hereby incorporated by reference herein in their entirety.

TECHNICAL FIELD

The present disclosure relates to a method and device for establishing a connection using Bluetooth, which is a short-range communication technology, in a wireless communication system and, more particularly, to a method and device for providing a transport discovery service (TDS) for establishing a connection using a Bluetooth low energy (BLE) technology.

BACKGROUND ART

Bluetooth is an near field communication (NFC) technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device according to a Bluetooth communication method intended to be used using the Bluetooth device, and subsequently perestablish a connection.

Bluetooth communication methods include a basic rate/enhanced data rate (BR/EDR) method and a low energy (LE) method which is a low power method. The BR/EDR method may be referred to as Bluetooth Classic. The Bluetooth classic method includes a Bluetooth technology that has been continued from Bluetooth 1.0 using a basic rate and a Bluetooth technology using an enhanced data rate supported since Bluetooth 2.0.

The Bluetooth low energy (BLE) technology has been applied since Bluetooth 4.0 and may stably provide information of hundreds of kilobytes (KB) by consuming low energy. The BLE technology exchanges information between devices by utilizing an attribute protocol. This BLE method may reduce energy consumption by reducing overhead of a header and simplifying an operation.

Some Bluetooth devices do not have a display or a user interface. Complexity of connection/management/control/disconnection between various kinds of Bluetooth devices and Bluetooth devices employing similar technologies has increased.

Further, although Bluetooth may achieve a relatively high speed at a relatively low power and low cost, a transmission distance is generally limited to a maximum of 100 m, and thus, Bluetooth is suitable for use in a limited space.

DISCLOSURE

Technical Problem

The present disclosure provides a method for establishing a connection using a transport discovery service (TDS) in a wireless communication system.

The present disclosure also provides a method for efficiently parsing data for using a TDS by a terminal which receives an advertising packet.

The present disclosure also provides a data format of an advertising packet so that a user equipment (UE) may efficiently parse TDS data.

The present disclosure also provides a method for establishing a connection according to a distance by calculating a distance to a UE which has transmitted an advertising packet.

The present disclosure also provides a method for acquiring an icon image of a UE which has transmitted an advertising packet from the advertising packet or a server and outputting the acquired ion image.

Technical objects to be achieved by the present disclosure are not limited to the aforementioned technical objects, and other technical objects not described above may be evidently understood by a person having ordinary skill in the art to which the present disclosure pertains from the following description.

Technical Solution

In an aspect, a method for allowing a first device to be connected to a second device in a wireless communication system is provided.

Specifically, the method for allowing a first device to be connected to a second device in a wireless communication system according to an embodiment of the present disclosure includes: performing a procedure for setting an advertising packet for providing a transport discovery service (TDS); and transmitting the set advertising packet to the second device, wherein the advertising packet includes at least one advertising (AD) structure field, and one of the at least one AD structure field includes a first length field, an AD type field indicating a type of data for providing the TDS, and an AD data field including TDS data for providing the TDS.

Furthermore, in the present disclosure, the AD data field includes a plurality of length type value (LTV) fields including data related to the TDS, and each of the LTV fields includes a second length field, a type field indicating a type of the TDS data, and a data field including the TDS data.

Furthermore, in the present disclosure, the TDS data is manufacturer-specific data provided from a manufacturer of the first device, and the type field is a type value indicating the specific data.

Furthermore, in the present disclosure, the TDS data includes at least one of a unique identifier for identifying a service, a transmit (Tx) power indicating power for transmitting the advertising packet, a first device name, a device image icon indicating an image for identifying the first device, or a device image icon URL indicating an address for receiving the device image icon.

Furthermore, in the present disclosure, the method may further include: establishing a connection to the second device using a wireless communication unit if a distance to the second device is within a specific distance.

Furthermore, in the present disclosure, the method may further include: activating the wireless communication unit if the wireless communication unit is inactive.

Furthermore, in the present disclosure, the wireless communication unit is one of a Bluetooth low energy (BLE), a Bluetooth basic rate/enhanced data rate (BR/EDR), Wi-Fi, Wi-Fi direct, near field communication (NFC), or WiGig.

In another aspect, a method for allowing a second device to be connected to a first device in a wireless communication system includes: setting at least one scan parameter for receiving advertising packets transmitted from an adjacent device; and receiving an advertising packet for using a transport discovery service (TDS) from the first device, wherein the advertising packet includes at least one advertising (AD) structure field and one of the at least one AD structure field includes a first length field, an AD type field indicating a type of data for providing the TDS, and an AD data field including TDS data for providing the TDS.

Furthermore, in the present disclosure, the method may further include: parsing one AD structure field for using the TDS among the at least one AD structure field.

Furthermore, in the present disclosure, the AD data field includes a plurality of length type value (LTV) fields including data related to the TDS, and each of the LTV fields includes a second length field, a type field indicating a type of the TDS data, and a data field including the TDS data.

Furthermore, in the present disclosure, the TDS data is manufacturer-specific data provided from a manufacturer of the first device, and the type field is a type value indicating the specific data.

Furthermore, in the present disclosure, the TDS data includes at least one of a unique identifier for identifying a service, a transmit (Tx) power indicating power for transmitting the advertising packet, a first device name, a device image icon indicating an image for identifying the first device, or a device image icon URL indicating an address for receiving the device image icon.

Furthermore, in the present disclosure, the method may further include: calculating a distance value indicating a distance to the first device on the basis of the TX power; and establishing a connection to the first device using a wireless communication unit if the distance value is smaller than a specific value.

Furthermore, in the present disclosure, the specific value is a first value if the second device is first connected to the first device using the wireless communication unit, the specific value is a second value if the second device is reconnected to the first device using the wireless communication unit, and the first value is smaller than the second value.

Furthermore, in the present disclosure, the first value and the second value are set on the basis of setting information obtained from a user.

Furthermore, in the present disclosure, the connection using the wireless communication unit is established according to acknowledgement information related to connection obtained from a user or a predetermined connection method.

Furthermore, in the present disclosure, the method may further include: transmitting a request message for requesting device information related to the first device to a server on the basis of the device image icon URL; receiving a response message including the device information from the server, wherein the device information includes the device image icon; and outputting the device image icon.

In another aspect, a device includes: a communication unit communicating with the outside wiredly or wirelessly; and a processor functionally connected to the communication unit, wherein the processor sets at least one scan parameter for receiving advertising packets transmitted from an adjacent device and receives an advertising packet for using a transport discovery service (TDS) from the first device, wherein the advertising packet includes at least one advertising (AD) structure field, and one of the at least one AD structure field includes a first length field, an AD type field indicating a type of data for providing the TDS, and an AD data field including TDS data for providing the TDS, and the processor parses one advertising structure field for using the TDS among the at least one advertising structure field.

Furthermore, in the present disclosure, the AD data field includes a plurality of length type value (LTV) fields including data related to the TDS, each of the LTV fields includes a second length field, a type field indicating a type of the TDS data, and a data field including the TDS data, the TDS data is manufacturer-specific data provided from a manufacturer of the first device, and the type field is a type value indicating the specific data.

Furthermore, in the present disclosure, the TDS data includes at least one of a unique identifier for identifying a service, a transmission (Tx) power indicating power for transmitting the advertising packet, a first device name, a device image icon indicating an image for identifying the first device, or a device image icon URL indicating an address for receiving the device image icon.

Furthermore, in the present disclosure, the processor transmits a request message for requesting device information related to the first device to a server on the basis of the device image icon URL and receives a response message including the device information from the server, wherein the device information includes the device image icon, and the processor outputs the device image icon through an output unit.

Advantageous Effects

According to the method for establishing a connection using the BLE technology according to the present disclosure, the connection may be established using the TDS.

Furthermore, according to the present disclosure, by efficiently performing data parsing of an advertising packet for using the TDS, it is possible to reduce unnecessary protocols to efficiently operate the UE and to reduce power consumption.

Furthermore, according to the present disclosure, by establishing a connection according to a distance between the terminals, it is possible to establish a connection with the terminal close to establish the connection.

Furthermore, according to the present disclosure, by outputting an image icon of the UE which is to establish a connection, the UE that the user wants to establish a connection thereto may be recognized by intuition.

It will be appreciated by persons skilled in the art that that the effects that could be achieved with the present disclosure are not limited to what has been particularly described hereinabove and other advantages of the present disclosure will be more clearly understood by a person skilled in the art to which the present disclosure pertains, from the following detailed description.

DESCRIPTION OF DRAWINGS

FIGS. 6 and 7 illustrate examples of types of a message exchanged between a host stack and a controller to which the present disclosure is applied.

MODE FOR INVENTION

The aforementioned objects, features and advantages of the present disclosure will become more apparent through the following detailed description with respect to the accompanying drawings. Hereinafter, the embodiments of the present disclosure will be described with reference to the accompanying drawings, in which like numbers refer to like elements throughout the specification. In describing the present disclosure, a detailed description of known techniques associated with the present disclosure unnecessarily obscure the gist of the present disclosure, it is determined that the detailed description thereof will be omitted.

Hereinafter, a terminal related to the present disclosure will be described in detail with reference to the accompanying drawings. In the following description, usage of suffixes such as 'module', 'part' or 'unit' used for referring to elements is given merely to facilitate explanation of the present disclosure, without having any significant meaning by itself.

Also, in the present disclosure, a message may be called a data packet, a frame, a PDU, or the like.

Figure 1:
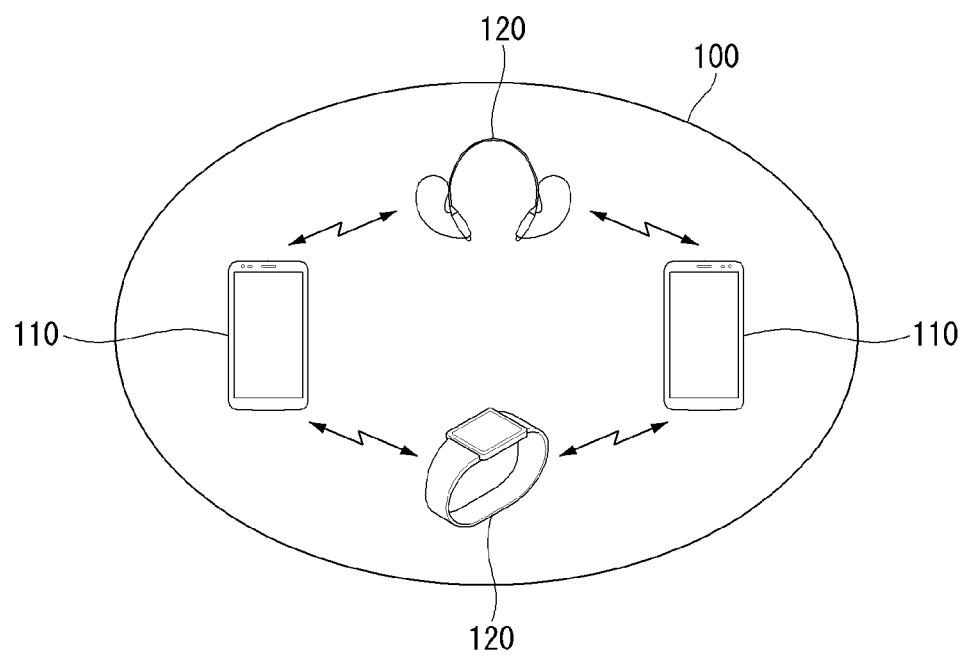
FIG. 1 is a schematic diagram illustrating an example of a wireless communication system using Bluetooth low energy (BLE) technology to which the present disclosure is applied.

FIG. 1 is a schematic diagram illustrating an example of a wireless communication system using Bluetooth low energy (BLE) technology to which the present disclosure may be applied.

A wireless communication system 100 includes at least one server device 120 and at least one client device 110.

The server device and the client device perform Bluetooth communication using a BLE technology.

First, BLE technology has a relatively small duty cycle, may be produced at low cost, and significantly reduces power consumption through a low data rate, and thus, it is possible to operate for more than a year in the case of using a coin cell battery, compared to Bluetooth basic rate/enhanced data rate (BR/EDR) technology.

In addition, the BLE technology simplifies a connection process between devices, and a packet size is smaller than that of the Bluetooth BR/EDR technology.

In BLE technology, (1) the number of RF channels is 40, (2) 1 Mbps is supported as a data rate, (3) topology is a scatternet structure, (4) latency is 3 ms, and (5) a maximum current is 15 mA or less, (6) output power is 10 mW (10 dBm) or less, and (7) the BLE technology is mainly used in applications such as mobile phones, watches, sports, healthcare, sensors, device control, and the like.

The server device 120 may operate as a client device in a relationship with other devices, and the client device may operate as a server device in a relationship with other devices. That is, in the BLE communication system, any one device may operate as a server device or a client device, and may operate as both a server device and a client device, if necessary.

The server device 120 may be represented as a data service device, a slave device, a slave, a server, a conductor, a host device, a gateway, a sensing device, a monitoring device, a second device, an audio gate (AG), and the like, and the client device 110 may be represented as a master device, a master, a client, a member, a sensor device, a sink device, a collector, a first device, a handsfree device, and the like.

The server device and the client device correspond to main components of the wireless communication system, and the wireless communication system may include other components in addition to the server device and the client device.

The server device refers to a device which is provided with data from the client device, directly communicates with the client device, and provides data to the client device through a response when a data request is received from the client.

In addition, the server device sends a notification message and an indication message to the client device to provide data information to the client device. In addition, when the server device transmits the indication message to the client device, the server device receives a confirmation message corresponding to the indication message from the client.

In addition, in the process of transmitting and receiving the notification message, the indication message, and the confirmation message to and from the client device, the server device may provide data information to a user through a display unit or may receive a request input from a user through a user input interface.

In addition, the server device may read data from a memory unit or write new data to the corresponding memory in the process of transmitting and receiving a message to and from the client device.

In addition, one server device may be connected to a plurality of client devices and may be easily reconnected (or connected) with client devices by using bonding information.

The client device 120 refers to a device that requests data information and data transmission from the server device.

The client device receives data from the server device through the notification message, the indication message, and the like, and when the indication message is received from the server device, the client device sends a confirmation message in response to the indication message.

Similarly, the client device may provide information to the user through an output unit or receive an input from the user through the input unit in the process of transmitting and receiving a message to and from the server device.

In addition, the client device may read data from a memory or write new data into the corresponding memory in the process of transmitting and receiving a message to and from the server device.

Hardware components such as the output unit, the input unit, and the memory of the server device and the client device will be described in detail with reference to FIG. 2.

In addition, the wireless communication system may configure personal area networking (PAN) through Bluetooth technology. For example, in the wireless communication system, files, documents, and the like may be exchanged quickly and safely by establishing a private piconet between devices.

Figure 2:
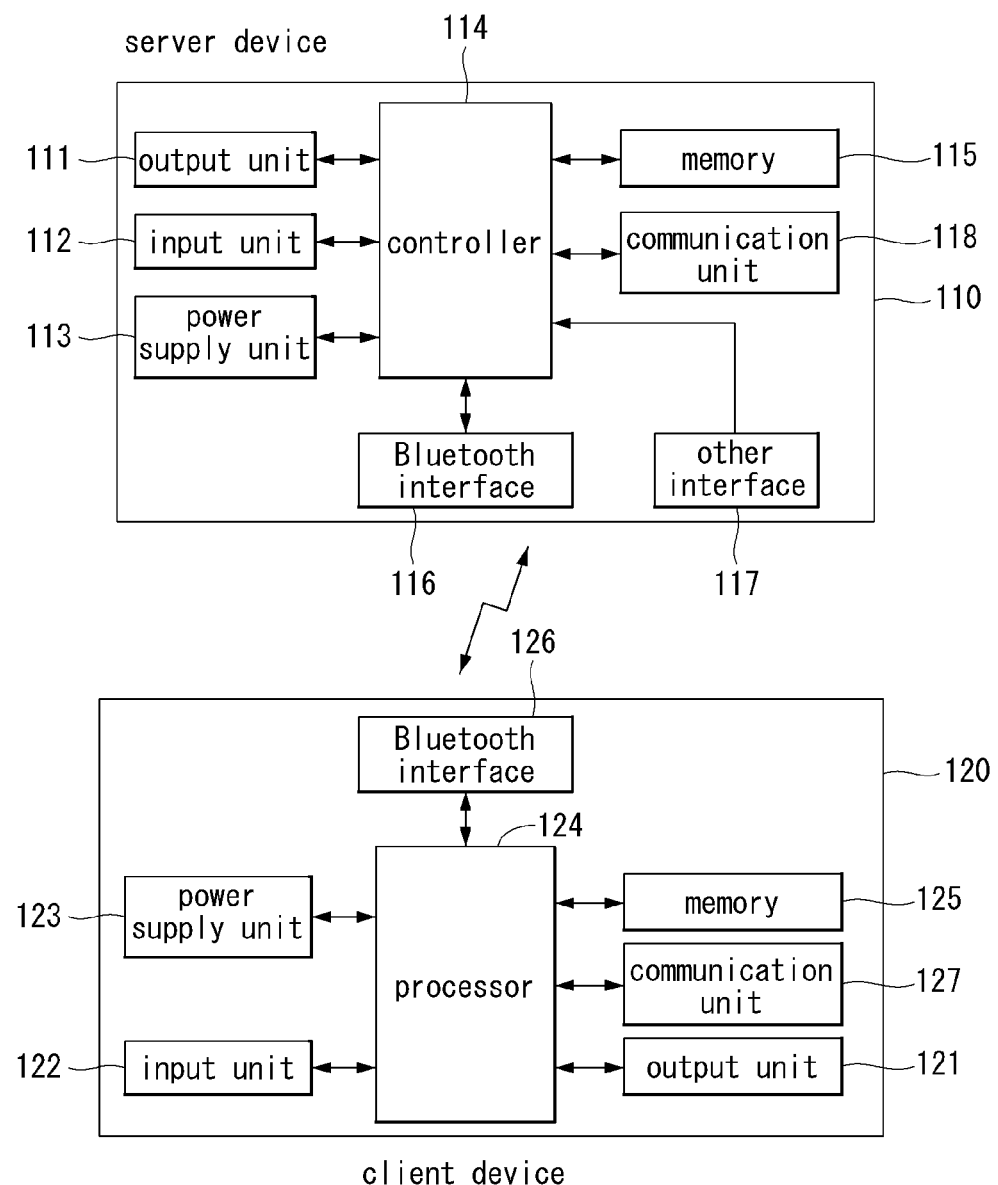
FIG. 2 shows an example of an internal block diagram of a device to which the present disclosure is applied.

FIG. 2 shows an example of an internal block diagram of a device to which the present disclosure may be applied.

As shown in FIG. 2, the device proposed in the present disclosure includes a network interface 210, a display unit 220, a user input interface 230, a control unit 240, a multimedia module 250, a storage 260, a memory unit 270, and a power supply unit 280.

The network interface 210, the display unit 220, the user input interface 230, the control unit 240, the multimedia module 250, the storage 260, the memory unit 270, and the power supply unit 280 are functionally connected to perform the method proposed in this disclosure.

The network interface 210 refers to a device that enables the device to perform wired or wireless communication with another device. The network interface 210 may include an energy efficient interface 212 and a legacy interface 214.

The energy efficient interface 212, as a device for low energy wireless communication with low energy consumption, refers to a unit (or module) that enables the device to search for another device or to transmit data.

The legacy interface 214, as a device for wireless communication, refers to a unit (or module) that enables the device to search for another device or transmit data.

The network interface may be called a communication unit.

The display unit 220 refers to a unit (or module) outputting data received through the network interface 210 or data stored in the storage 260 under the control of the control unit 240.

The control unit 240 refers to a module that controls an overall operation of the device. The control unit 240 may be represented by a controller, a processor, and the like.

The control unit 240 may include an application-specific integrated circuit (ASIC), another chipset, a logic circuit, and/or a data processing device.

The control unit 240 controls the network interface 210 to receive an advertising message from another device, controls the communication unit to transmit a scan request message to the other device and receive a scan response message as a response on the scan request from the other device, and controls the network interface to transmit a connection request message to the server device to establish a Bluetooth connection with the other device.

In addition, the control unit 240 controls the communication unit to read or write data from or into the other device using an attribute protocol after the Bluetooth LE connection is established through the connection procedure.

The multimedia module 250 is a unit (or module) for reproducing various kinds of multimedia, and the multimedia module 250 may be implemented in the control unit 240 or separately.

The storage 260, as a unit implemented in various kinds of devices, refers to a non-volatile unit that may store various kinds of data.

The memory unit 270, as a unit implemented in various kinds of devices, refers to a volatile unit in which various kinds of data are temporarily stored.

The memory unit 260 may include a read-only memory (ROM), a random access memory (RAM), a flash memory, a memory card, a storage medium, and/or another storage device.

The wireless communication network 210 may include a baseband circuit for processing wireless signals. When the embodiment is implemented in software, the technique described above may be implemented as a module (process, function, etc.) for performing the function described above. The module may be stored in the memory unit 270 or the storage 260 and executed by a processor.

The memory unit 270 may exist inside or outside the control unit 240 and may be connected to the control unit 240 by various well-known units.

The power supply unit 280 refers to a module that supplies power required for an operation of each component upon receiving external power and internal power under the control of the control unit 240.

As described above, BLE technology has a small duty cycle and thus significantly reduces power consumption through a low data rate. As a result, the power supply unit may supply power required for an operation of each component even with a low output power (10 mW (10 dBm or less)).

The user input interface 230 refers to a module that provides a user's input to the control unit 240 like a screen button so that the user may control the operation of the device.

Figure 3:
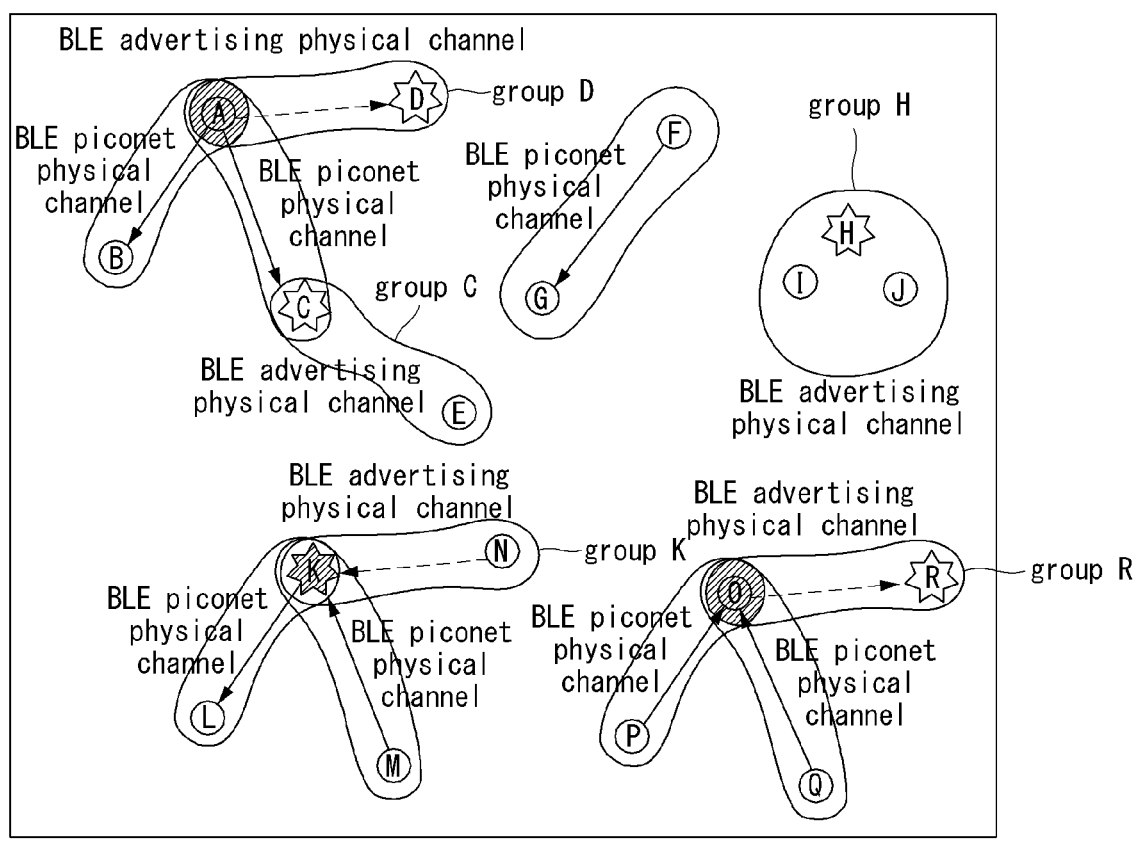
FIG. 3 shows an example of a BLE topology.

FIG. 3 is a view illustrating an example of a Bluetooth low energy topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slaves do not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 3, five different device groups are present.

1. Device D is an advertiser and device A is an initiator (group D).
2. Device E is a scanner and Device C is an advertiser (group C).
3. Device H is an advertiser, and devices I and J are scanners (group H).
4. Device K is also an advertiser, and device N is an initiator (group K).
5. Device R is an advertiser, and device O is an initiator (group R).

The devices A and B use a single BLE piconet physical channel.

The devices A and C use another BLE piconet physical channel.

In group D, the device D advertises using an advertising event connectable in an advertisement physical channel, and the device A is an initiator. The device A may establish a connection with the device D and add a device to the piconet A.

In group C, the device C advertises on an advertisement physical channel by using a certain type of an advertising event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertising event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertising event connectable on an advertisement physical channel, and the device O is an initiator. The device O may establish a connection with the device R. Here, the device O may be a slave of two devices and a master of one device at the same time.

Figure 4:
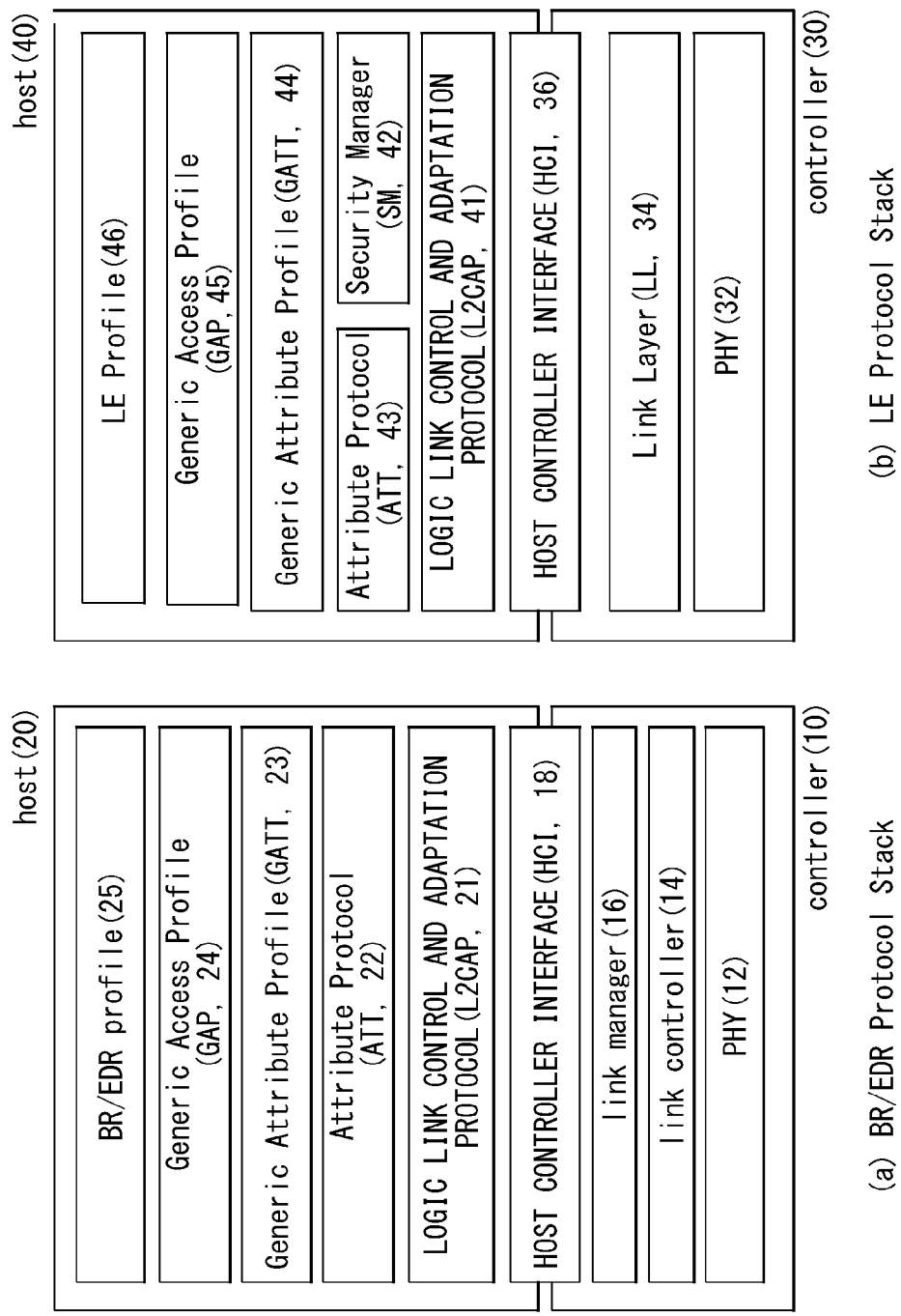
FIG. 4 is a diagram illustrating an example of a Bluetooth communication architecture to which the present disclosure is applied.

FIG. 4 is a view illustrating an example of a Bluetooth communication architecture proposed in this specification.

With reference to FIG. 4, FIG. 4(a) illustrates one example of protocol stack of Bluetooth BR (Basic Rate)/EDR (Enhanced Data Rate), and FIG. 4(b) illustrates one example of a protocol stack of Bluetooth LE (Low Energy).

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The controller stack 10 may include a PHY layer 12, a link controller layer (Link Controller, 14) and a link manager layer (Link Manager, 16).

The PHY layer 12 is a layer transmitting and receiving a 2.4 GHz wireless signal, and in case of using Gaussian frequency shift keying (GFSK) modulation, the BR/EDR PHY layer 12 may transmit data by hopping 79 RF channels.

The link controller layer 14 serves to transmit a digital signal, selects a channel sequence hopping 1400 times per second, and transmits a time slot having a length of 625 us for each channel.

The link manager layer 16 controls a general operation (link setup, control, security) of a Bluetooth connection by utilizing a link manager protocol (LMP).

The link manager layer 16 may perform the following functions.

The link manager layer 16 may perform ACL/SCO logical transport, logical link setup, and control.

Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides the interface between the Host module and the Controller module to allow the host to provide the command and the data to the controller and the controller to provide the event and the data to the host.

The host stack (or host module) 20 includes a logical link control and adaptation protocol (L2CAP) 21, an attribute protocol 22, a generic attribute profile (GATT) 23, and a generic access profile (GAP) 24, and a BR/EDR profile 25.

The logic link control and adaptation protocol (L2CAP) 21 may provide one bidirectional channel for transmitting the data to a specific protocol or profile.

The L2CAP 21 may multiplex various protocols, profiles, and the like provided in a higher Bluetooth layer.

The L2CAP of the Bluetooth BR/EDR uses a dynamic channel, supports a protocol service multiplexer, retransmission, and a streaming mode, and provides segmentation, reassembly, per-channel flow control, and error control.

The generic attribute profile (GATT) 23 may be operable as a protocol describing how the attribute protocol 22 is used in setting services. For example, the GATT 23 may be operable to specify how ATT attributes are grouped together into services and operable to describe features associated with the services.

Thus, the GATT 23 and the attribute protocol (ATT) 22 may use features to describe a state and services of a device and to describe how features relate to each other and how they are used.

The attribute protocol 22 and the BR/EDR profile 25 define a service profile using a Bluetooth BR/EDR and an application protocol for sending and receiving these data, and the generic access profile (GAP) 24 defines device discovery, connection, and a security level.

As illustrated in FIG. 4(b), the Bluetooth LE protocol stack includes a controller stack 30 which is operable to process a wireless device interface of which a timing is important and a host stack 40 which is operable to process high-level data.

First, the controller stack 30 may be implemented by using a communication module which may include a Bluetooth wireless apparatus, for example, a processor module which may include a processing device such as a microprocessor.

The host stack may be implemented as a part of an OS which operates on the processor module or instantiation of a package above the OS.

In some cases, the controller stack and the host stack may be actuated or executed on the same processing device in the processor module.

The controller stack 30 includes a physical layer (PHY) 32, a link layer 34, and a host controller interface 36.

The physical layer (PHY) (wireless transceiving module) 32 as a layer that transceives a 2.4 GHz wireless signal uses Gaussian frequency shift keying (GFSK) modulation and a frequency hopping technique constituted by 40 RF channels.

The link layer 34 that serves to transmit or receive a Bluetooth packet performs advertising and scanning functions by using three advertising channels and thereafter, provides functions to generate a device-to-device connection and transmit and receive a data packet of a maximum of 257 bytes through 37 data channels.

The host stack may include a logic link control and adaptation protocol (L2CAP) 41, a security manager (SM) 42, an attribute protocol (ATT) 43, a generic attribute profile (GATT) 44, a generic access profile 45, and an LE profile 46. However, the host stack 40 is not limited thereto and the host stack 40 may include various protocols and profiles.

The host stack may multiplex various protocols, profiles, and the like provided in the higher Bluetooth layer by using the L2CAP.

First, the logic link control and adaptation protocol (L2CAP) 41 may provide one bidirectional channel for transmitting the data to a specific protocol or profile.

The L2CAP 41 is operable to multiplex the data among higher layer protocols, segment and reassemble packages, and manage multicast data transmission.

In the Bluetooth LE, three fixed channels (one for a signaling CH, one for the security manager, and one for the attribute protocol) are basically used. And, If necessary, a dynamic channel also may be used.

On the contrary, in basic rate/enhanced data rate (BR/EDR), the dynamic channel is basically used and the protocol service multiplexer, the retransmission, the streaming mode, and the like are supported.

The security manager (SM) 42 is a protocol for authenticating the device and providing key distribution and manages overall Bluetooth LE security.

The attribute protocol (ATT) 43 defines a rule for accessing data of a counter device in a server-client structure. The ATT includes six following message types (request, response, command, notification, indication, and confirmation).

① Request and Response message: a request message refers to the message used by a client device to request or transfer specific information to a server device, and a response message refers to the message used by the server device to transmit to the server device in response to the request message.

② Command message: a message transmitted from a client device to a server device to command a specific operation. The server device does not transmit a response to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

The generic access profile 45 as a layer newly implemented for the Bluetooth LE technology is used for selecting a role for communication among Bluetooth LE devices and control how multi profiles are actuated.

Further, the generic access profile (GAP) 45 is primarily used in device discovery, connection creation, and security procedure parts and defines a scheme for providing the information to the user and defines the type of the attribute.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46 has a dependency on the GATT and is used mainly for Bluetooth LE devices. For example, the LE profile 46 includes Battery, Time, FindMe, Proximity, Time and the like; specific contents of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 is operable as a protocol for describing how the attribute protocol 43 is used at the time of setting the services. For example, the generic attribute profile (GATT) 44 is operable to regulate how ATT attributes are together grouped by the services and operable to describe features associated with the services.

Therefore, the generic attribute profile 44 and the attribute protocol (ATT) 43 may use the features in order to describe the status of the device and the services and describe how the features are associated with each other and how the features are used.

Hereinafter, the procedures of the Bluetooth low energy (BLE) technology will be described in brief.

The BLE procedures may be divided into a device filtering procedure, an advertising procedure, s scanning procedure, a discovering procedure, a connecting procedure, and the like.

As illustrated in FIG. 4, the device may support only the Bluetooth BR/EDR or LE and may operate in a dual mode supporting both the Bluetooth BR/EDR and LE.

A device operating in the dual mode may establish a security connection through secure simple pairing with the device supporting only the BR/EDR through a link manager, and establish a security connection through a security manager with the device supporting only the LE.

Hereinafter, the procedures of the Bluetooth low energy (BLE) technology will be described in brief.

The BLE procedures may be divided into a device filtering procedure, an advertising procedure, s scanning procedure, a discovering procedure, a connecting procedure, and the like.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, undirected broadcast refers to broadcasting in all directions rather than in a specific direction.

On the other hand, directed broadcast refers to broadcasting in a specific direction. Undirected broadcast is performed without involving a connection procedure between an advertising device and a device in a listening state (in what follows, it is called a listening device).

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of data from advertising devices using an advertising physical channel.

The scanning device transmits a scan request to an advertising device through an advertising physical channel in order to request additional data from the advertising device. The advertising device transmits a scan response as a response with respect to the scan request, by including additional data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device perestablishing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

Figure 5:
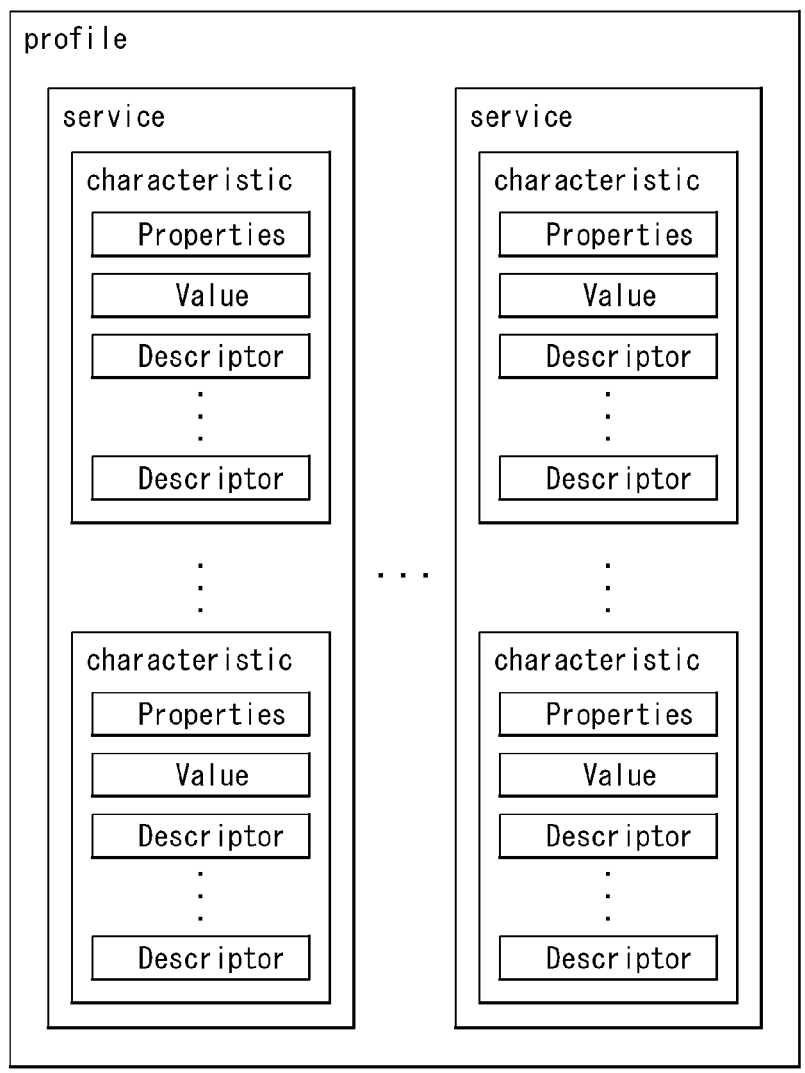
FIG. 5 is a diagram illustrating an example of a structure of a generic attribute profile (GATT) of BLE.

FIG. 5 is a diagram illustrating an example of a structure of a GATT of BLE.

A structure for exchanging profile data of BLE will be described with reference to FIG. 5.

Specifically, the GATT defines a method of exchanging data using services and characteristics between Bluetooth LE devices.

In general, a peripheral device (e.g., a sensor device) acts as a GATT server and has definitions of services and characteristics.

A GATT client send a data request to the GATT server to read or write data, and all transactions begin at the GATT client and a response is from the GATT server.

The GATT-based operation structure used in the Bluetooth LE is based on a profile, a service, and a characteristic and may have a vertical structure as shown in FIG. 5.

The profile includes one or more services, the one or more services may include one or more characteristics or other services.

The service serves to divide data into logical units and may include one or more characteristics or other services. Each service has a 16-bit or 128-bit identifier called a universal unique identifier (UUID).

The characteristic is the lowest level unit in the GATT-based operation structure. The characteristic includes only one data and has a 16-bit or 128-bit UUID similar to the service.

The characteristic is defined as a value of various pieces of information and requires one attribute to include each information. The characteristic may use various continuous attributes.

Figure 6:
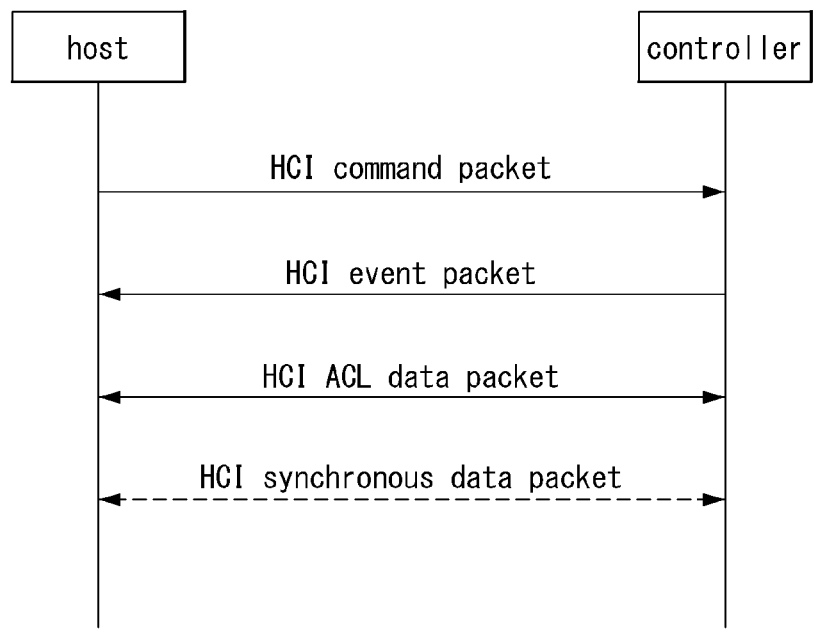

The attribute includes four components and has the following meaning.
handle: address of attribute
Type: Type of attribute
Value: Value of attribute
Permission: authority to access attribute FIGS. 6 and 7 illustrate examples of types of messages exchanged between a host stack and a controller to which the present disclosure is applied.

A host controller transport layer of a device provides transparent exchange of HCI specific information.

Such a transmission mechanism provides a function in which a host sends a HCI command, ACL data, and synchronous data to a BR/EDR controller and sends a HCI command and ACL data to an LE controller or AMP controller.

This transmission mechanism also provides a function in which the host receives an HCI event, ACL data, and synchronous data from the BR/EDR controller and an HCI event and ACL data from the LE or AMP controller.

The host controller transport layer provides transparent exchange of HCI-related information, so an HCI specification specifies a command, an event, and a data exchange form between the host and the controller.

An HCI command packet may be set as shown in (a) of FIG. 7 and is used when the host transmits a command for indicating an operation to a controller.

An HCI event packet may be set as shown in (b) of FIG. 7 and used for the controller to inform the host of an event that occurs.

An HCI ACL data packet is used to exchange asynchronous data between the host and the controller.

An HCI synchronous data packet is used to exchange synchronous data between the host and the controller.

Figure 8:
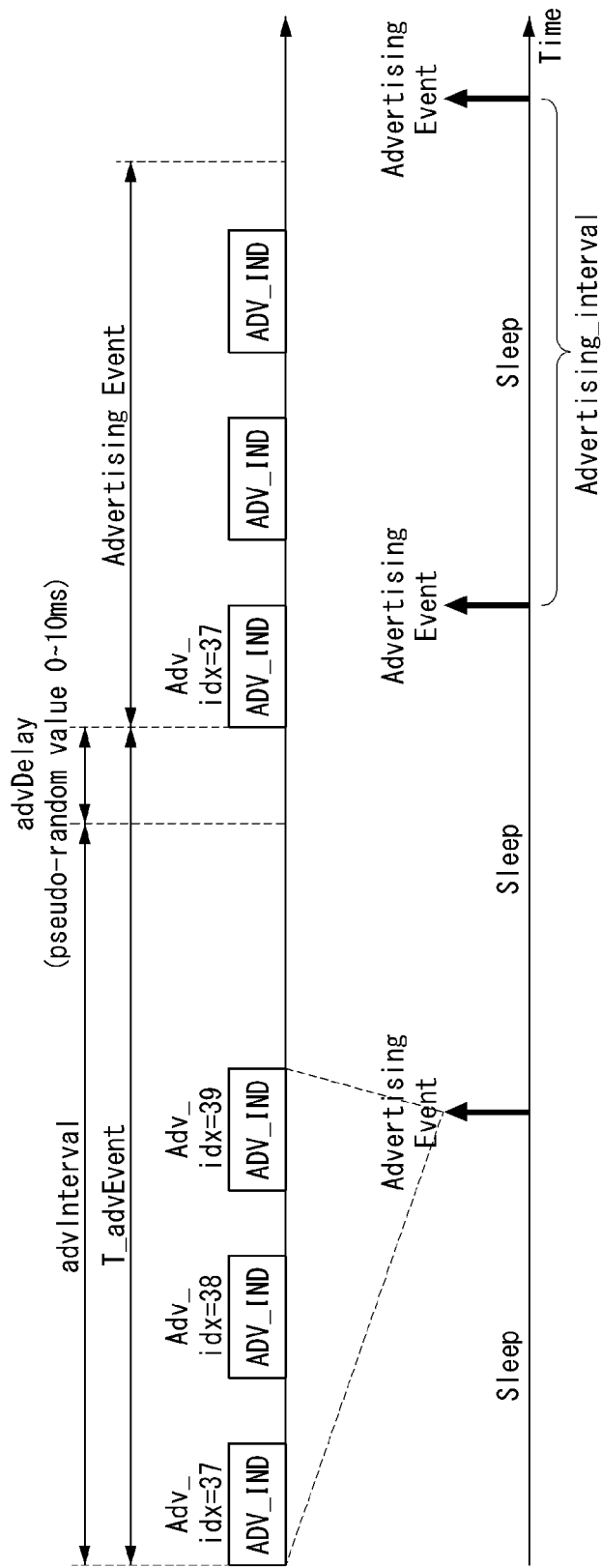
FIG. 8 is a diagram illustrating an example of an advertising operation to which the present disclosure is applied.

FIG. 8 is a diagram illustrating an example of an advertising operation to which the present disclosure is applied.

Referring to FIG. 8, a device in an advertising state may transmit an advertising packet to adjacent devices in an advertising channel for each advertising event.

Specifically, the advertising event may be defined by transmitting one or a plurality of advertising packets in a last advertising channel starting from a first advertising channel among three advertising channels.

Here, the advertising event may be terminated at an early stage if a connection request message for a connection or a scan response message is received.

A time between advertising events may be defined as an advertising interval.

A time (T_advEvent) between successive advertising events for the same advertising event data sets for all non-directional advertising events or connectable directional advertising events used in a low duty cycle mode may be defined as the sum of advInterval and advDelay.

AdvInterval may be an integer multiple of 0.625 ms in the range of 20 ms to 10,485.759375 s, and advDelay is a pseudo-random value in the range of 0 ms to 10 ms generated by a link layer for each advertising event.

Figure 9:
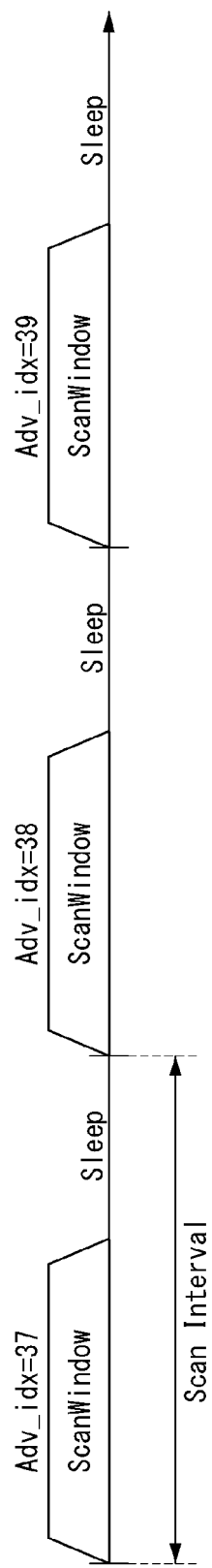
FIG. 9 is a diagram illustrating an example of a scanning operation to which the present disclosure is applied.

FIG. 9 is a diagram illustrating an example of a scanning operation to which the present disclosure is applied.

Referring to FIG. 9, a device in a scanning state may receive advertising packets transmitted through an advertising channel during a scanning interval.

Specifically, when the device performs a scanning operation, the link layer listens to whether an advertising packet is transmitted in an advertising channel.

There are two types of scanning operation, and a passive type and an active type are determined by the host.

During scanning, the link layer may listen to whether advertising packets are sent in the advertising channel at a ScanWindow interval, and a scan interval may be defined as an interval between starts of two consecutive scan windows.

Figure 10:
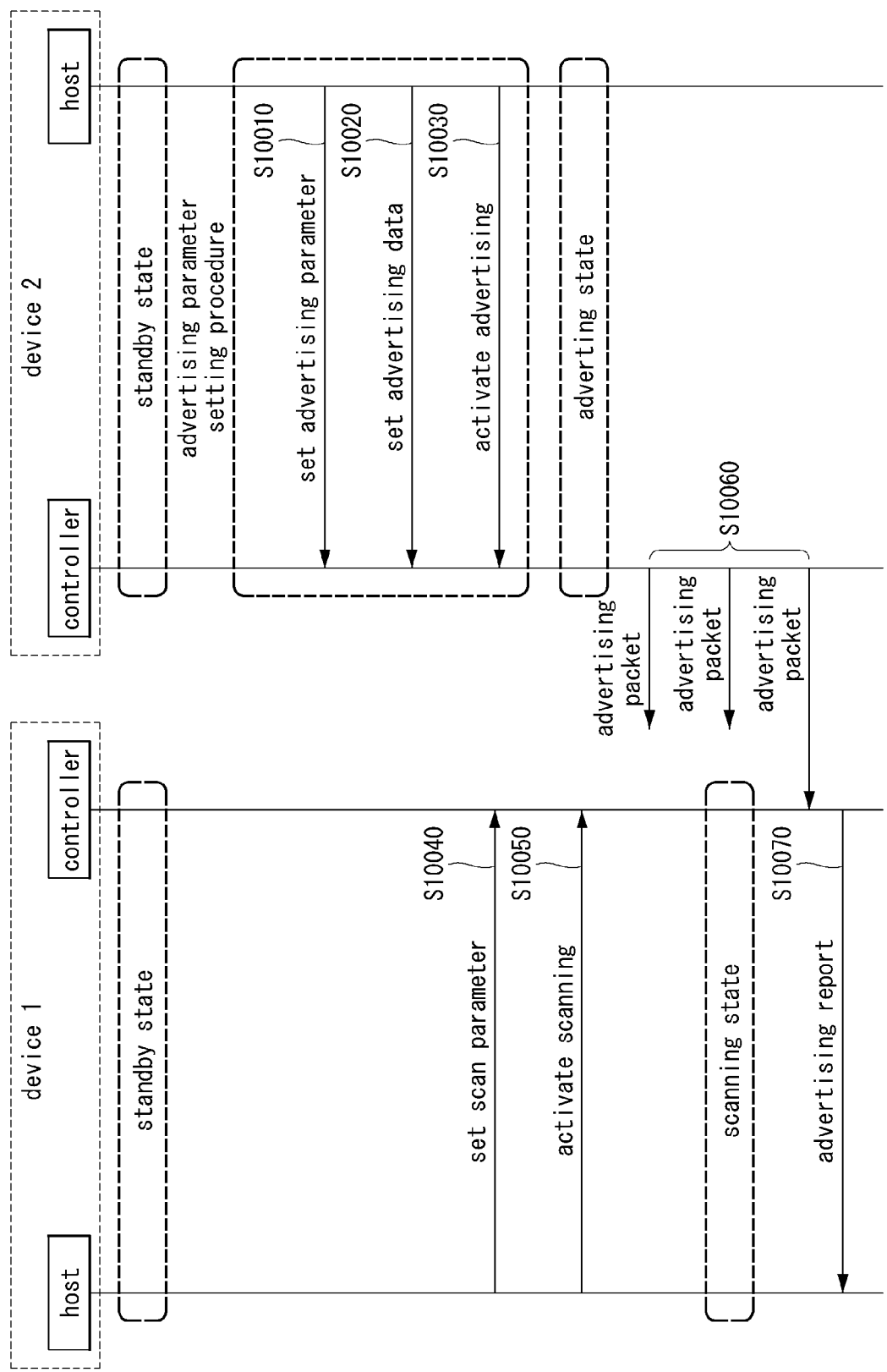
FIG. 10 is a diagram illustrating an example of a method for setting and transmitting an advertising packet to which the present disclosure is applied.

FIG. 10 is a diagram illustrating an example of a method for setting and transmitting an advertising packet to which the present disclosure is applied.

Referring to FIG. 10, a device serving as a server may include specific information in an advertising packet and transmit the same to adjacent devices through a procedure for setting an advertising packet.

Specifically, device 2 performs an advertising parameter setting procedure to include the specific information in an advertising packet in a standby state.

First, a host of device 2 transmits a set advertising parameter command to a controller to set parameters related to an interval and an address to which the advertising packet is transmitted (S10010).

In this case, the set advertising parameter command may be referred to as an HCI_LE_Set_Advertising_Parameter Command.

A maximum transmission interval of the advertising packet, a minimum transmission interval of the advertising packet, a type of the advertising packet, a type of address used for the advertising packet, and an advertising channel used for the transmission of the advertising packet through the set advertising parameter command.

In addition, the host transmits a set advertising data command to the controller in order to set data used for advertising packets including a data field (S10020).

Here, the set advertisement data command may be referred to as an HCI_LE_Set_Advertising_Data command.

Through the set advertising data command, the device 2 may set data included in the advertising packet.

For example, if the device 2 wants to include data for a transport discovery service in an advertising packet, the device 2 may include data for TDS in the advertising packet through the set advertising data command.

Thereafter, the host transmits an advertising activation command to the controller in order to start or stop the operation of transmitting the advertising packet (S10030).

After receiving the advertising activation command from the host, the controller continuously transmits the advertising packet to adjacent devices until an advertising activation command for stopping transmission of the advertising packet is received from the host.

Thereafter, the device 2 enters an advertising state for transmitting the advertising packet, and the controller of the device 2 periodically transmits the advertising packet in the advertising event as described above with reference to FIG. 8 (S10060).

The device 1 may perform a scanning operation by setting a scanning parameter to receive advertising packets transmitted from adjacent devices in a standby state.

First, the host of the device 1 transmits a set scan parameter command to the controller in order to set parameters for scanning described above with reference to FIG. 9 (S10040).

In this case, the set scan parameter command may be referred to as HCI_LE_Set_Scan_Parameter.

A type of a scanning operation such as passive scanning or active scanning, an interval at which a scanning operation is performed, a scan window, and a type of an address used in scan request packets may be set through the set scan parameter command.

After setting the parameters for the scanning operation through the set scan parameter command, the host transmits an enable scanning command to the controller to start a scanning operation (S10050).

In this case, the scanning enable command may be referred to as a LE_Set_Scan_Enable command.

Thereafter, the device 2 enters a scanning state to perform a scanning operation and receives advertising packets transmitted from the adjacent devices during the scanning window interval as described above with reference to FIG. 9.

For example, the device 2 may receive advertising packets transmitted from the device 2 during the scanning interval of the device 1.

When the advertising packet is received, the controller of the device 1 generates an advertising report and sends the advertising report to the host in order to report the advertising packet to the host (S10070).

In this case, the advertising report may be called LE_Advertising_Report_Event and may be generated based on one or a plurality of advertising packets.

Figure 11:
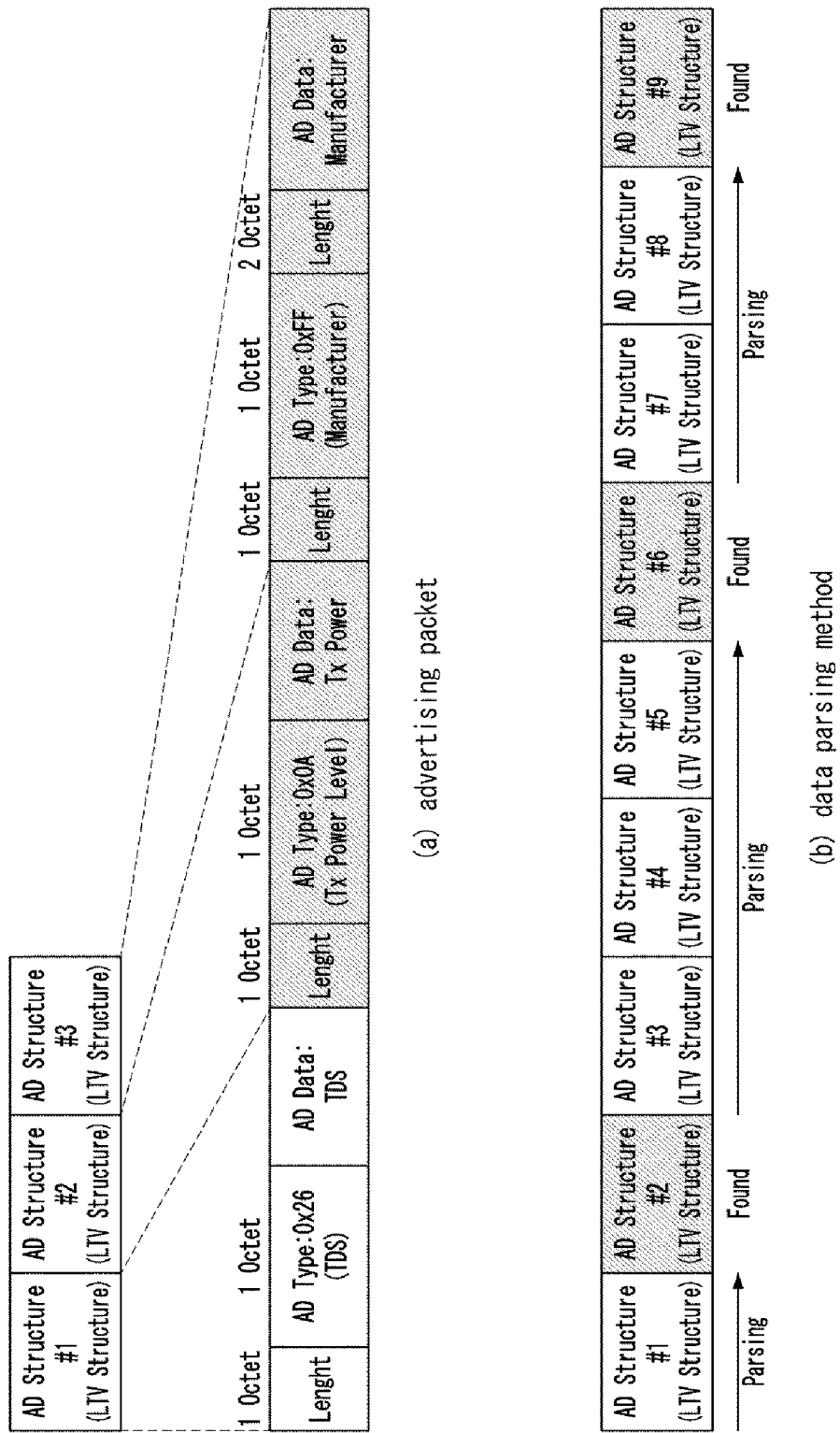
FIG. 11 is a diagram illustrating an example of a data format of an advertising packet and a method of parsing an advertising packet.

FIG. 11 illustrates an example of a data format of an advertising packet and a method of parsing an advertising packet.

Referring to FIG. 11, the advertising packet has an AD structure, and the device must parse each of the AD structures in order to find desired data.

Specifically, devices serving as a server may include specific data in an advertising packet in an AD structure through the above-described advertising parameter setting procedure.

For example, in case where the device intends to transmit Tx Power which is transmit power, data for providing TDS, and manufacturer information which is information related to a manufacturer, through an advertising packet, the advertising packet may be set as shown in (a) of FIG. 11.

Here, the AD structure may be configured as a length type value (LTV) structure.

A length field may indicate a length of data, an Ad Type field may indicate a type of data to be included, and Ad Data may include actual data.

A scanner that receives the advertising packet must parse the entire advertising packet because it cannot know in which AD structure the desired data is included in the entire advertising packet.

For example, if the information desired by the scanner is included in AD structures #2, #6, and #9 in (b) of FIG. 11, the scanner must parse all the AD structures to search for the AD structures #2, #6, and #9.

In addition, there is a problem in that it is difficult to recognize which service the device transmitting the advertising packet has set and broadcast the advertising packet to perform.

Due to such a problem, there may be a delay for the device to obtain the desired information from the advertising packet.

Accordingly, the present disclosure proposes a data format and method for continuously including information desired by a scanner in one AD structure defined in a TDS.

Figure 12:
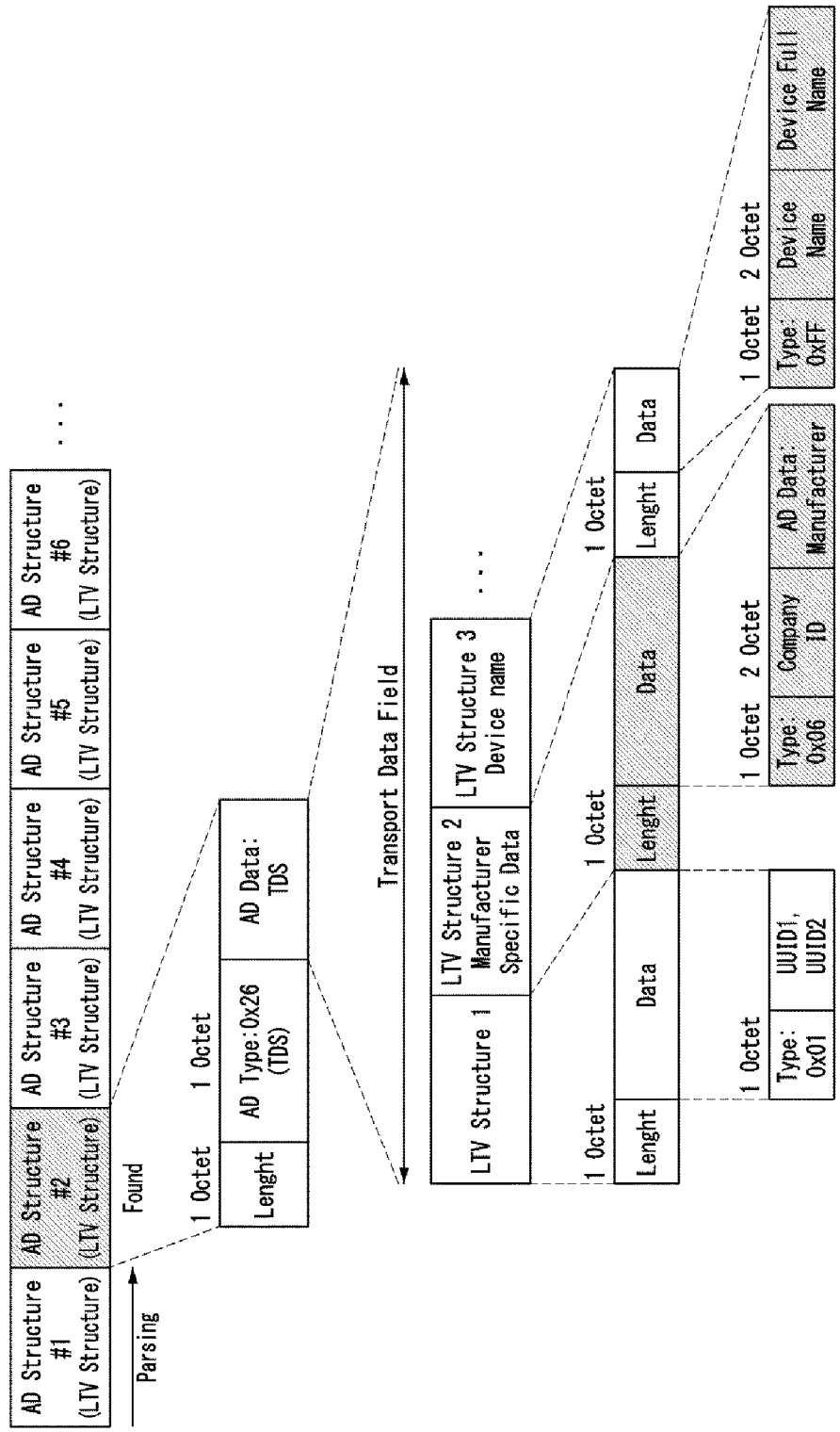
FIGS. 12 and 13 illustrate examples of a data format of an advertising packet proposed in the present disclosure.
Figure 13:
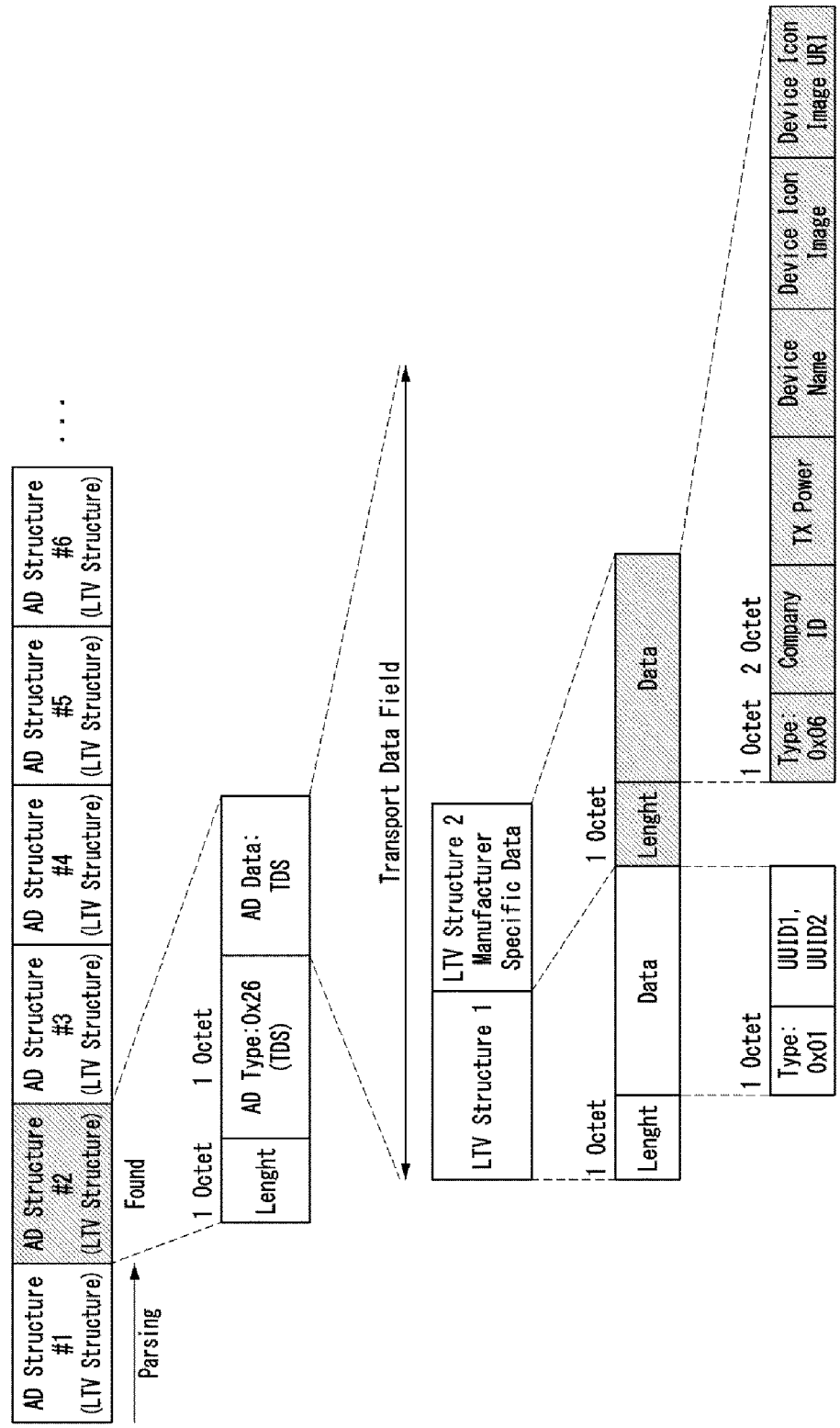

FIGS. 12 and 13 illustrate an example of a data format of an advertising packet proposed in the present disclosure.

Referring to FIGS. 12 and 13, data for the TDS is included in one AD structure, and the scanner may parse only one AD structure for the TDS in the process of parsing the received AD packet and may not parse AD structures that follow.

In detail, as illustrated in FIGS. 12 and 13, the AD packet includes a plurality of AD structures, and each of the AD structures may have an LTV structure.

That is, each AD structure may include length, AD Type, and AD data fields.

The length field indicates a total number of octets that follow. The length field allows the scanner to determine the length of the variable fields that follow the length field.

The AD type indicates a type of data included in AD data and may include a type value indicating the TDS in the present disclosure.

For example, if the type value indicating the TDS is "0x26" and the AD data field includes information for the TDS, the AD type field may include a value "0x26".

The AD Data field includes data according to the AD type and may include one or more LTV Structures.

For example, if the AD type field includes a type value indicating TDS, the AD data field may include data for providing the TDS.

Here, the data for providing the TDS may be included in one AD structure, and when the scanner detects the AD structure including data for the TDS in the process of parsing the AD structures of the AD packet, the scanner may not parse following AD structures.

LTV structures each have an LTV structure including a length field, a type field, and a value field. The type field includes a type value of specific data for providing each service included in the data field, and the data field includes specific data for providing a specific service.

For example, if the AD data field includes data for the TDS, the LTV structures of the AD data field may each include specific data for providing the TDS.

In this case, the type field may indicate a value of a specific data type for the TDS included in the data field.

Table 2 below shows an example of type values of data for providing the TDS.

TABLE 2

| Type | LTV Structure |
| --- | --- |
| 0x00 | Reserved for Future Use |
| 0x01 | 16-bit Service UUID List |
| 0x02 | 32-bit Service UUID List |
| 0x03 | 128-bit Service UUID List |
| 0x04 | Availability Offset |
| 0x05 | Seeker Address |
| 0x06 | Manufacturer Specific Data |
| 0x07-0xFF | Reserved for Future Use |

In Table 2, data for each type is as follows.

Service UUID List: A list of UUIDs that identify a service for each bit.

Availability Offset: An estimated time until transmission is available if a transmission status of a TDS flag is set to temporarily unavailable.

Seeker Address: BR/EDR Address (BD_ADDR) of a device to be connected by a BR/EDR. It may be used for a seeker which transmits a message requesting or indicating activation of a wireless communication unit through a TDS control point of a provider to inform the provider of a BR/EDR address (BD_ADDR) to be connected by the BR/EDR.

Manufacturer Specific Data: Data provided by a manufacturer of a device (e.g., company-specific ID (company ID), specific data provided by the manufacturer, etc.)

In addition, although not shown in Table 2, data for providing the TDS may include a device name, a device full name, a device icon image, a device icon image uniform resource locator (URL), transmit power (Tx Power), and the like.

Device Name or Device Full Name: Device-specific name
Device Icon Image: Device-specific icon image
Device Icon Image URL: A URL from which information related to a device may be obtained
Tx Power: Transmit power of an AD packet transmitted from a transmitter Here, as for the AD structure for providing the TDS, each data may be included in each LTV structure as shown in FIG. 12 or remaining data except for the UUID may be included in one LTV structure as shown in FIG. 13.

By including the data for the TDS in one AD structure using the above method, if the device which has received the AD packet finds only one AD structure for the TDS through the parsing operation, the device may not need to parse subsequent AD structures.

Accordingly, it is possible to provide or acquire data for a specific service within a short time with low power.

Figure 14:
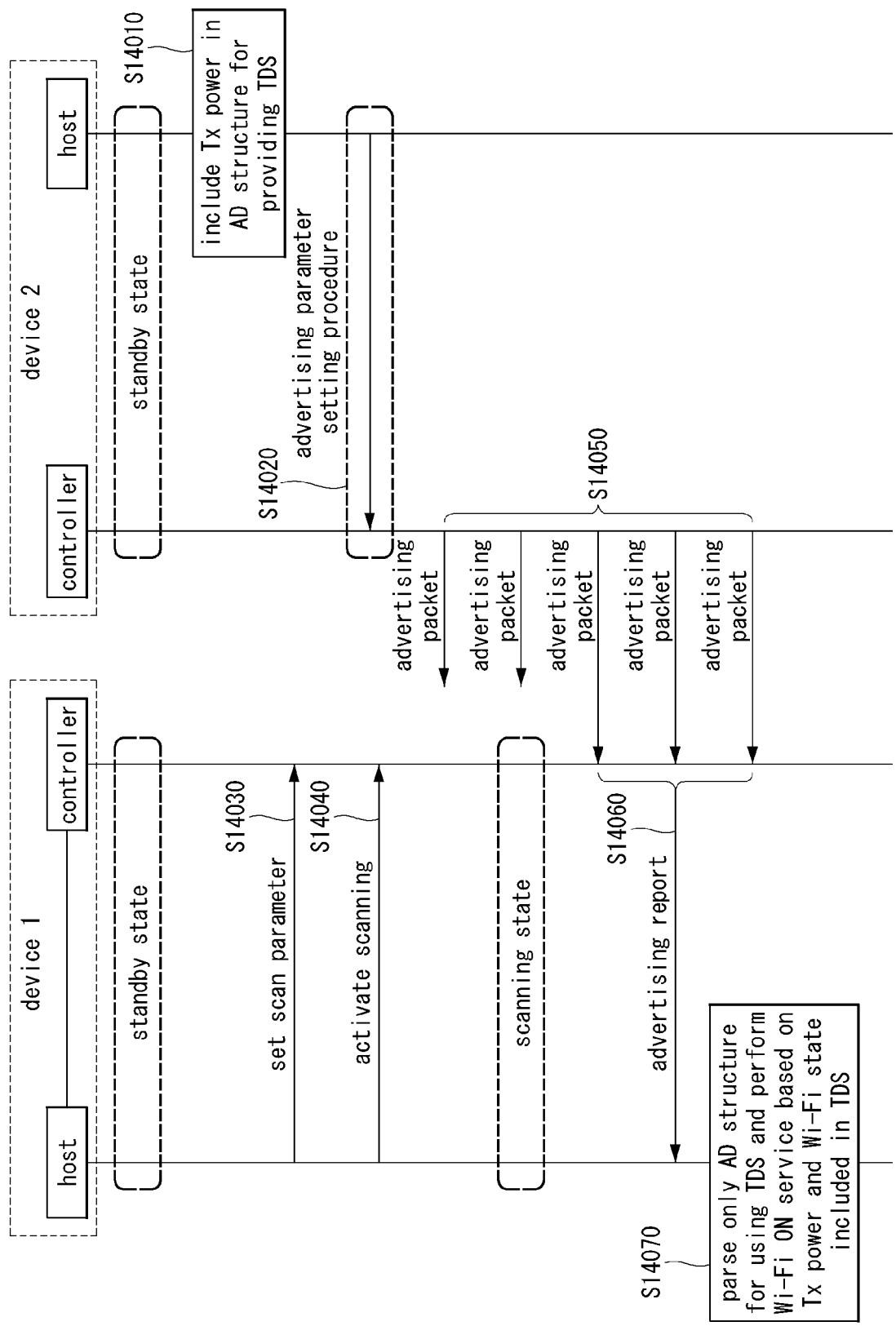
FIG. 14 is a diagram illustrating an example of a method for transmitting an advertising packet proposed in the present disclosure.

FIG. 14 is a diagram illustrating an example of a method for transmitting an advertising packet proposed in the present disclosure.

Referring to FIG. 14, a TDS may be provided by setting an AD packet described with reference to FIGS. 12 and 13.

Specifically, the host of device 2 may perform an advertising parameter setting procedure to include information for providing a TDS in an AD packet (S14010 and S14020).

In this case, the advertising parameter setting procedure may be performed through steps S10010 to S10030 described above with reference to FIG. 10, and the set AD packet may be set to have the structure as shown in FIG. 12 or 13.

The set AD packet may include Tx Power and the device 2 may perform a service for establishing a connection by controlling activation of a wireless communication unit (e.g., Bluetooth BR/EDR, Bluetooth LE, Wi-Fi, Wi-Fi Direct, WiGig, Zigbee, NFC, etc.) according to a distance to the device 1 on the basis of the Tx power.

Thereafter, the device 2 transmits the set advertising packet to adjacent devices in a set advertising channel (S14050).

The controller and the host of the device 1 may set scan parameters through the scanning parameter setting and activation operations described in steps S11040 and S11050 of FIG. 10 (S14030 and S14040).

The controller of device 1 may receive an advertising packet from device 2 through a scanning operation, generate an advertising report based on at least one received advertising packet, and transmit the generated advertising report to the host (S14060).

The advertising report may include information included in the received advertising packet.

The host of device 1 may perform a parsing operation to obtain desired information among advertising packet information included in the advertising report, and stop the parsing operation if the AD structure related to the TDS is found.

Thereafter, the host may establish a connection by using a short-range wireless communication unit based on the information for the TDS included in the found AD Structure.

Specifically, a distance to the device 2 may be calculated based on the transmit power included in the parsed AD structure. When the distance between the device 1 and the device 2 is within a certain distance, the device 1 may establish a connection with the device using a wireless communication unit.

In this case, the distance between the device 1 and the device 2 may be calculated through a received signal strength indicator (RSSI) based on the transmit power.

In this case, if a wireless communication unit of the device 2 is inactive, the device 1 may activate the wireless communication unit of the device 2.

For example, the device 1 may transmit a message requesting or indicating activation of the wireless communication unit to the device 2, and when the device 2 receives the message, the device 2 may activate the wireless communication unit.

Through this method, the device 2 may include data for the TDS in one AD structure, and the device 1 may parse only one AD structure for the TDS and may not parse subsequent AD structures.

In addition, the device 1 may calculate the distance to the device 2 based on the information for the TDS included in the AD structure, and determine whether to establish a connection using the wireless communication unit according to the distance to the device 2.

Figure 15:
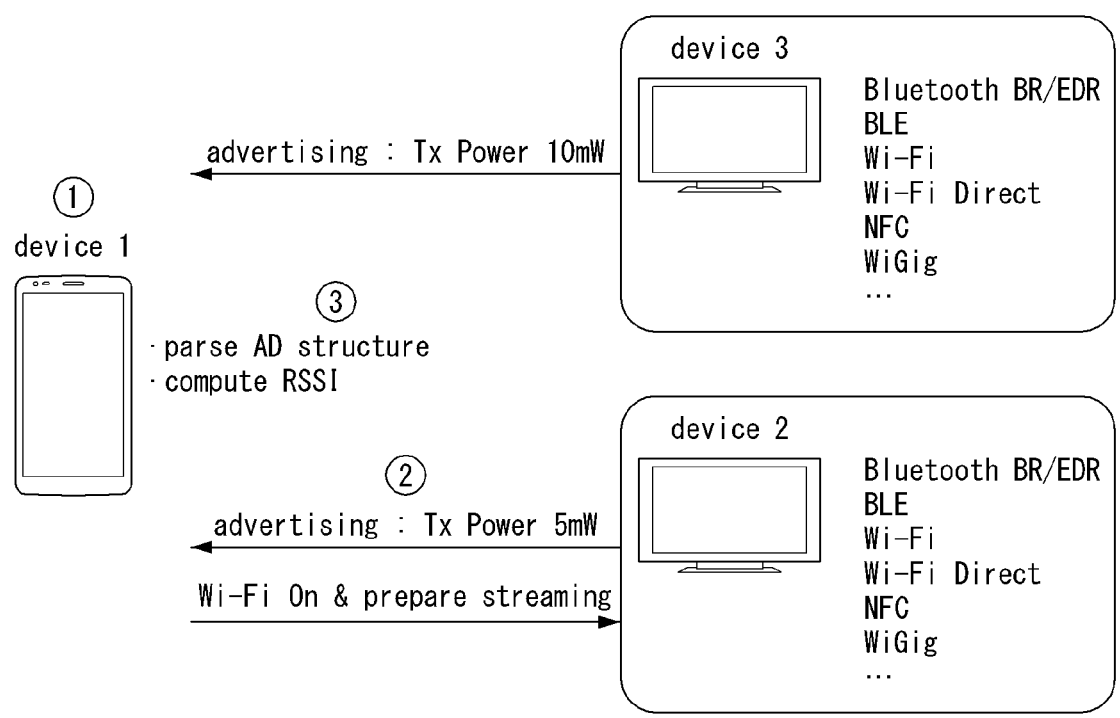
FIG. 15 is a diagram illustrating an example of a method for establishing a connection between devices proposed in the present disclosure.

FIG. 15 is a diagram illustrating an example of a method for establishing a connection between devices proposed in the present disclosure.

Referring to FIG. 15, the device 1 may establish a connection by calculating a distance to the device 2 based on transmit power transmitted from the device 2.

Specifically, ① if the device 1 intends to establish a connection with one of adjacent devices (device 2 and device 3) using a TDS, the device 1 may set the scanning parameter described above with reference to FIG. 14 to receive advertising packets transmitted from the adjacent devices (device 2 and device 3).

② The adjacent devices (devices 2 and 3) may include data for the TDS in the advertising packet through the advertising parameter setting procedure described above with reference to FIG. 14 and transmit the set advertising packets to the adjacent devices.

In this case, the set advertising packets may have such a structure as shown in FIG. 12 or 13.

③ The device 1 may receive advertising packets transmitted from the adjacent devices (device 2 and device 3) and parse the received advertising packets, and may calculate distances to the adjacent devices (device 2 and device 3) based on Tx power included in the advertising packets.

In this case, the distances between the device 1 and the adjacent devices (device 2 and device 3) may be calculated through RSSI.

Thereafter, when there is a device existing within a predetermined distance among the adjacent devices (device 2 and device 3), the device 1 may establish a connection with the device existing within the predetermined distance by using a wireless communication unit.

For example, as shown in FIG. 15, if the Tx power of the device 3 is 10 mW, the device 1 may calculate a distance value indicating a distance to the device 3, and if the calculated distance value is larger than a specific value, the device 1 may not establish a connection with the device 3.

However, if the Tx power of the device 2 is 5 mW, the device 1 may calculate a distance value to the device 2, and if the calculated distance value is smaller than the specific value, the device 1 may establish a connection with the device 2 via Wi-Fi.

In this case, if the Wi-Fi of the device 2 is inactive, the device 1 may transmit a message indicating the activation of the Wi-Fi and preparation of a service to be performed to the device 2.

By using this method, the device 1, which is a scanner, may use the TDS even if it parses only one AD structure, and may establish a connection by using a wireless communication unit according to the distance to the device 2.

In another embodiment of the present disclosure, if a distance to the device 2 calculated by the device 1 is within the predetermined distance, the device 1 may output a message for connection with the device 2 and establish a connection by obtaining confirmation information related to the connection from the user.

In this case, the device 1 may output a device image icon of the device 2 included in the advertising packet together with the message for connection, and if the user clicks the image icon of the device 2, the device 1 may establish a connection with the device 2.

Alternatively, the device 1 may establish a connection with device 2 according to a distance on the basis of a predetermined method.

For example, the device 1 may obtain setting information for establishing a connection according to a distance to the user in advance, and if the distance to the device 2 is within the predetermined distance based on the obtained setting information, a procedure for establishing a connection may be set to be performed without acquiring the confirmation information.

In another embodiment of the present disclosure, the device 1 may set a specific value, which is a distance for establishing a connection, according to whether the device 2 has been connected.

That is, if the device 2 has been connected to the device 1, the device 1 may establish a connection with the device 2 even at a greater distance than the initial connection.

For example, if the device 2 is first connected with the device 1, the device 1 calculates a distance to the device 2 based on an advertising packet transmitted from the device 2.

If the calculated distance value is smaller than a first value, the device 1 may perform the procedure for establishing a connection with the device 2 using the wireless communication unit.

However, if the calculated distance value is larger than the first value, the device 1 recognizes that the distance to the device 2 is too far to establish a connection, so the device 1 may not perform the procedure for establishing a connection with the device 2 using a communication unit.

If the device 1 has previously established a connection with the device 2, the device 1 calculates the distance to device 2 based on the advertising packet transmitted from the device 2.

If the calculated distance value is smaller than the second value, the device 1 may perform the procedure for establishing a connection with the device 2 using the wireless communication unit.

However, if the calculated distance value is larger than the second value, the device 1 recognizes that the distance to the device 2 is too far to establish a connection, so the device 1 may not perform the procedure for establishing a connection with the device 2 using the communication unit.

In this case, the first value may be smaller than the second value, and the first value and the second value may be set by the user.

That is, the device 1 may obtain the setting information from the user, and set the first value and the second value based on the obtained setting information.

In another embodiment of the present disclosure, the device 1 may have a white list and a black list set to establish a connection, and may perform a connection based on a distance to another device according to the white list and the black list.

For example, when the device 2 is included in the white list, the device 1 may establish a connection with the device 2 by using a wireless communication unit if the distance to the device 2 is within the predetermined distance.

However, when the device 2 is included in the black list, the device 1 may not establish a connection with the device 2 using the wireless communication unit even if the device 2 is within the predetermined distance.

Using the above method, the device 1 may calculate a distance to the device 2 through the advertising packet transmitted from the device 2, and establish a connection according to the distance to the device 2.

Figure 16:
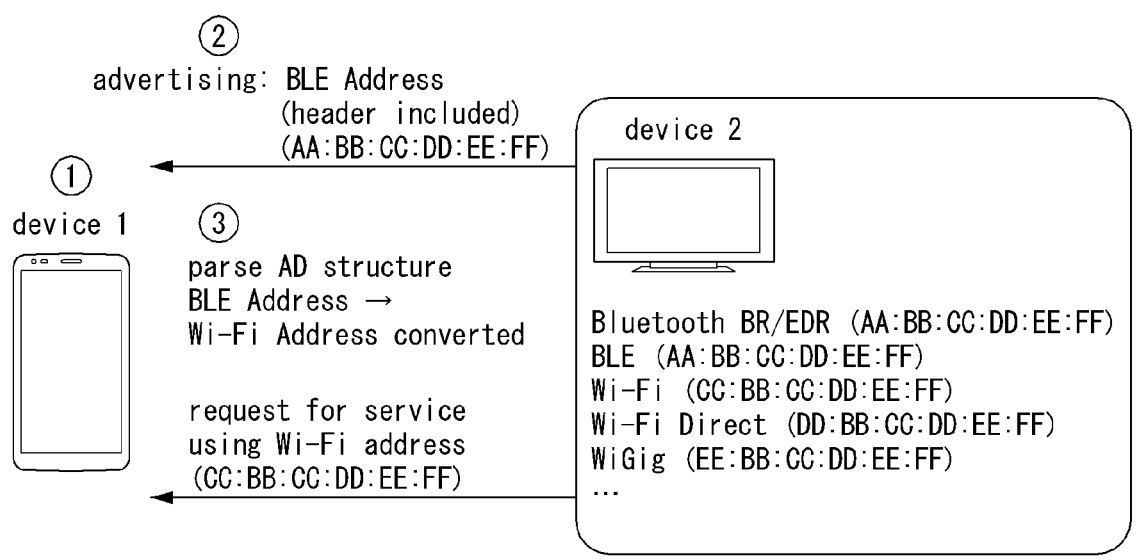
FIG. 16 illustrates another example of a method for establishing a connection between devices proposed in the present disclosure.

FIG. 16 illustrates another example of a method for establishing a connection between devices proposed in the present disclosure.

Referring to FIG. 16, ① in case where the device 1 wants to establish a connection with the device 2 using the TDS, the device 1 may receive an advertising packet transmitted from device 2 by setting the scanning parameter described above with reference to FIG. 14.

② The device 2 may include data for the TDS in the advertising packet through the advertising parameter setting procedure described above with reference to FIG. 14, and transmit the set advertising packet to adjacent devices.

In this case, the set advertising packet may have such a structure as shown in FIG. 12 or 13, and may include a Bluetooth LE address in a header thereof.

③ The device 1 may receive the advertising packet transmitted from the device 2 and parse the received advertising packet, and obtain a Bluetooth LE address and a Wi-Fi address from the parsed AD structure.

Thereafter, the device may convert the address of the Bluetooth LE to an address of the Wi-Fi, request the device 2 to establish a connection via Wi-Fi using the converted Wi-Fi address, and request the use of a service of Wi-Fi.

Figure 17:
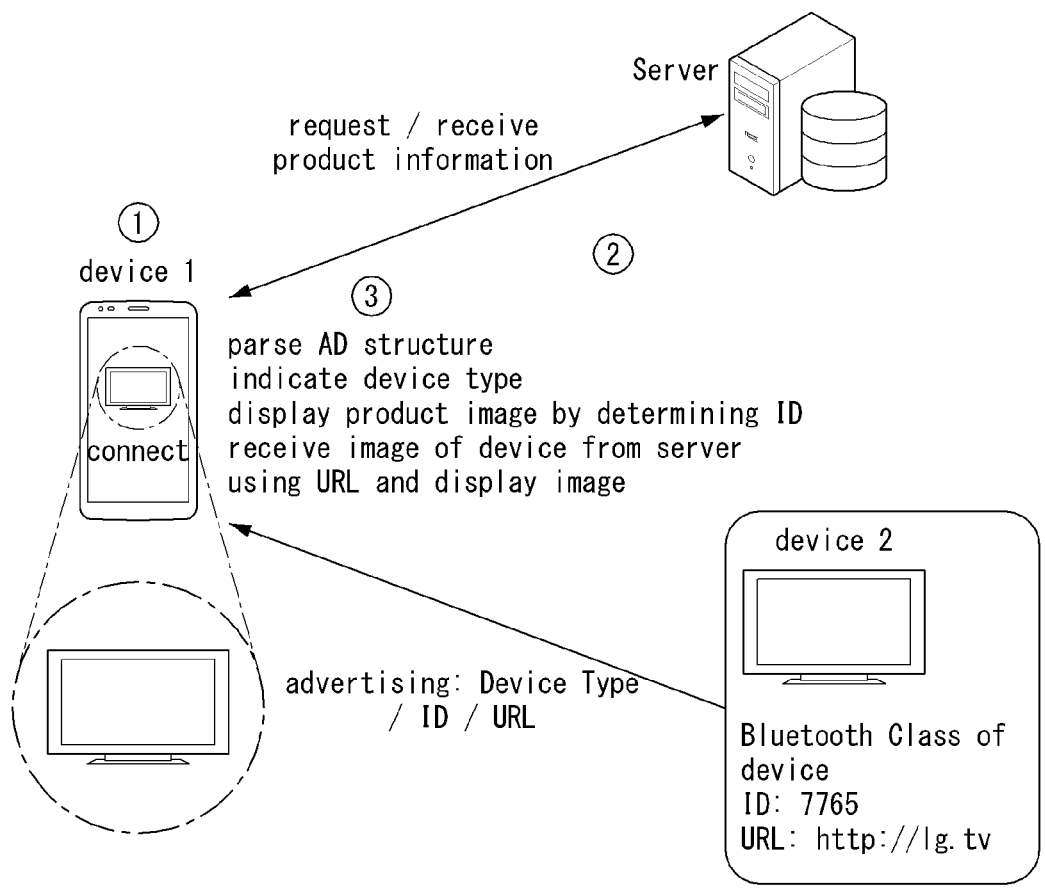
FIG. 17 is a diagram illustrating an example of a method for establishing a connection by obtaining device information from a server proposed in the present disclosure.

FIG. 17 is a diagram illustrating an example of a method for establishing a connection by obtaining device information from a server proposed in the present disclosure.

Referring to FIG. 17, THE device 1 may obtain information related to THE device 2 from a server based on an advertising packet received from the device 2 and output the obtained information.

Specifically, ① in case where the device 1 wants to establish a connection with the device 2 through the wireless communication unit by using the TDS, the device 1 may receive an advertising packet transmitted from the device 2 by setting the scanning parameter described above with reference to FIG. 14.

The device 2 may include data for the TDS in the advertising packet through the advertising parameter setting procedure described ABOVE with reference to FIG. 14 and transmit the set advertising packet to adjacent devices.

In this case, the SET advertising packet may have such a structure as shown in FIG. 12 or 13, and may include at least one of a type of the device 2, an ID of the device 2, device image icon for identifying the device 2, or a device image icon URL indicating an address for obtaining information related to a device.

② The device 1 may obtain data for a TDS by parsing AD structures of the received advertising packet.

In this case, if the parsed AD Structure includes the type of the device 2, the ID, and the device image icon of the device 2, the device 1 may output the type 2, the ID, and the device image icon of the device 2.

③ However, if the AD structure does not include the type, the ID, or the device image icon of the device 2, the device 1 determines whether the device 1 is connected to a network.

When the device 1 is connected to the network, the device 1 may transmit a request message for requesting at least one of the type, the ID, or the device image icon of the device 2 to the server based on the device image icon URL.

The server transmits to the device 1 a response message including at least one of the type, the ID, and the device image icon of the device 2 based on the request message.

The device 1 may output the type of the device 2, the ID of the device 2, and the device image icon for visually recognizing the device 2 based on the received response message, and establish a connection with the device 2 based on an input obtained from the user or predetermined connection information.

Figure 18:
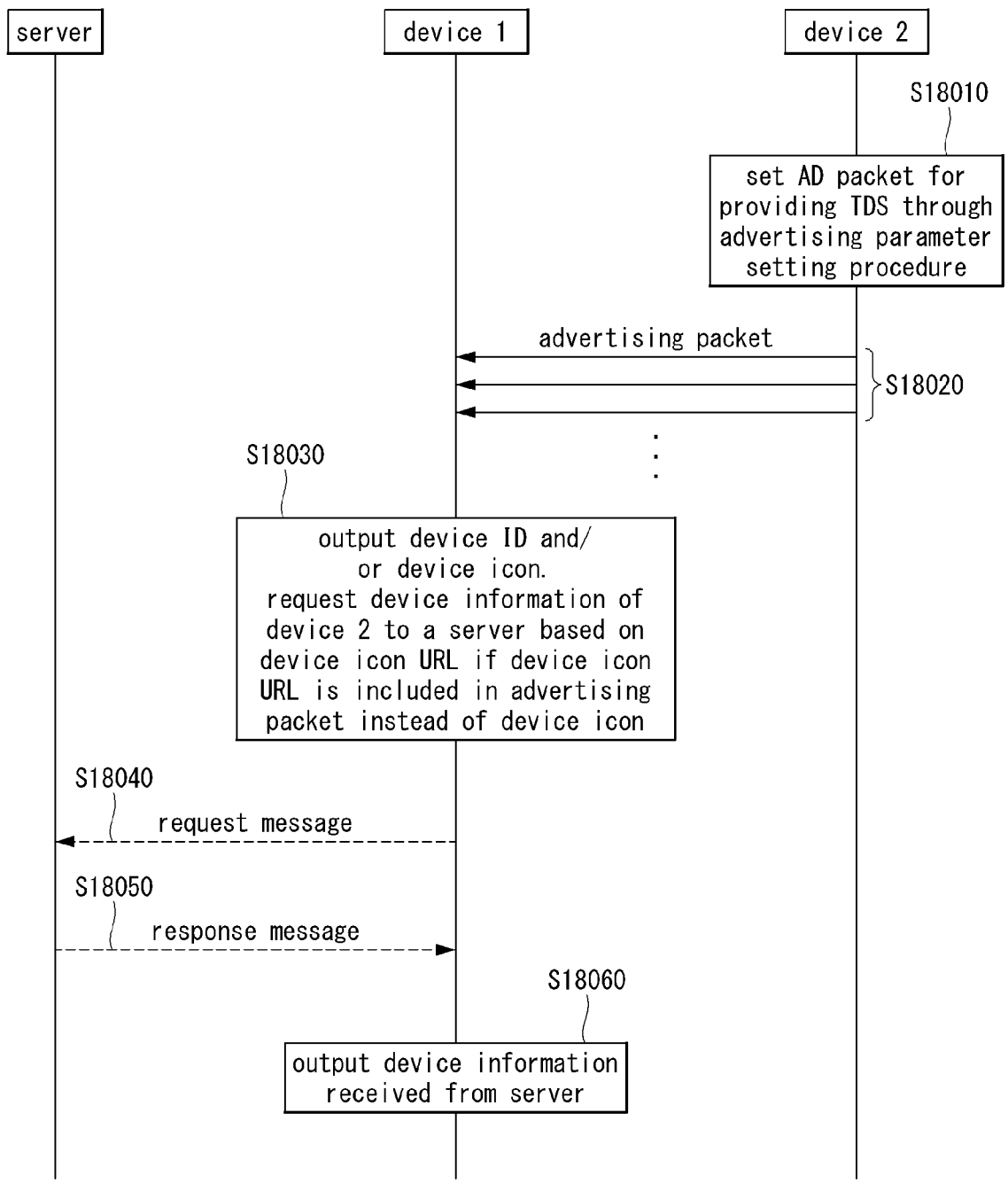
FIG. 18 is a diagram illustrating still another example of a method for establishing a connection by obtaining device information from a server proposed in the present disclosure.

FIG. 18 is a diagram illustrating another example of a method for establishing a connection by obtaining information of a device from a server proposed in the present disclosure.

Referring to FIG. 18, the device 1 may establish a connection with the device 2 by outputting the information of the device 2 based on the advertising packet received from the device 2.

Specifically, the device 2 may set an advertising packet for the TDS through the advertising parameter setting procedure described above with reference to FIG. 14 (S18010).

The set advertising packet may have a structure as shown in FIG. 12 or 13 and may include at least one of the type of the device 2, the ID, a device image icon, or a device image icon URL in order for the device 1 to specifically recognize a shape of the device 2.

Thereafter, the device 2 transmits the set advertising packet to adjacent devices in the set advertising channel (S18020).

In case where the device 1 wants to establish a connection with the device 2 through the wireless communication unit by using the TDS, the device 1 may receive an advertising packet transmitted from the device 2 by setting the scanning parameters described above with reference to FIG. 14.

If the advertising packet received from the device 2 includes the device image icon, the device 1 may output the type, ID, and device image icon of the device 2 (S18030).

However, if the advertising packet includes the device image icon URL instead of the device image icon, the device 1 determines whether the device 1 is connected to a network.

If the device 1 is connected to the network, the device 1 may transmit a request message for requesting device information (e.g., an image icon) of the device 2 to the server based on the device icon URL (S18040).

When the server receives the request message from the device 1, the server transmits a response message including the device information to the device 1 (S18050).

The device 1 may output the type, the ID, and the device image icon of the device 2 based on the device information included in the response message transmitted from the server (S18060).

Thereafter, the device 1 may establish a connection with the device 2 based on an input obtained from a user or predetermined connection information.

Figure 19:
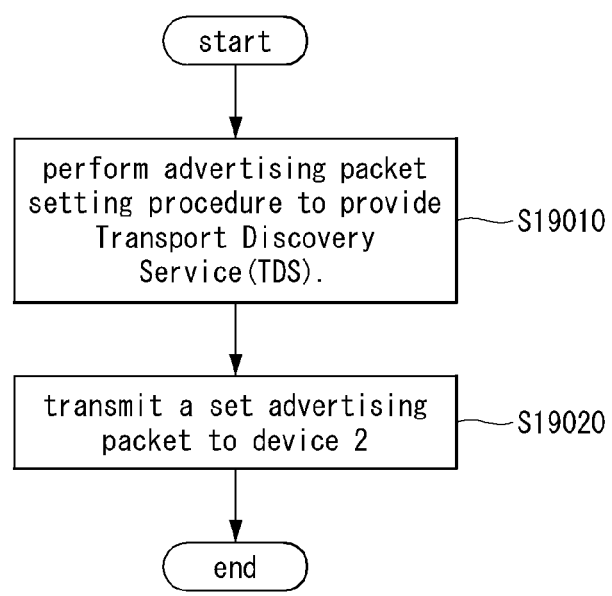
FIG. 19 illustrates an example of a method for providing a TDS by setting an advertising packet by a device proposed in the present disclosure.

FIG. 19 illustrates an example of a method for providing a TDS by setting an advertising packet by a device proposed in the present disclosure.

The device 1 performs a procedure for setting an advertising packet to include information for providing the TDS in an AD structure of the advertising packet (S19010).

In this case, the procedure for setting the advertising packet may be performed through the advertising parameter setting procedure described above with reference to FIG. 14, and the set advertising packet may include such a structure as shown in FIG. 12 or 13.

That is, the set advertising packet includes at least one advertisement structure field as shown in FIG. 12 or 13, and one of the at least one advertisement structure field includes a first length field, an AD type field indicating a type of data for providing the TDS, and an AD data field including TDS data for providing the TDS.

Thereafter, the device 1 may transmit the set advertising packet to the device 2 to establish a connection with the device 2 using the wireless communication unit based on the TDS (S19020).

In this case, the first device may transmit the advertising packet through the method described above with reference to FIG. 8 and may be connected to the device 2 through the wireless communication unit by performing one of the connection methods described above with reference to FIGS. 14 to 18.

The present disclosure described above is not applied to be limited to the configuration and method of the embodiments described above and the embodiments may be configured by selectively combining all or some of the embodiments so that various modifications may be made.

In addition, various substitutions, modifications and changes may be made by those skilled in the art to which the present disclosure pertains, without departing from the technical concept of the present disclosure, and therefore, the present disclosure is not limited by the embodiments described above and the accompanying drawings.

INDUSTRIAL APPLICABILITY

The present disclosure relates to Bluetooth data transmission and reception, and more particularly, to a method and device for establishing a connection through a wireless communication unit using the Bluetooth LE technology.

The invention claimed is:

1. A method for a first device to be connected to a second device in a wireless communication system, the method comprising:
   performing a procedure for setting an advertising packet for providing a transport discovery service (TDS);
   transmitting, to the second device, the set advertising packet,
   wherein the advertising packet comprises at least one advertising (AD) structure field,
   wherein each of the at least one AD structure field comprises (i) a length field, (ii) an AD type field representing a type of data included in an AD data field and (iii) the AD data field including the data, wherein, based on the AD type field being set to represent the TDS, the AD structure field comprising the AD type field comprises at least one sub AD structure field, wherein each of the at least one sub AD structure field comprises TDS data for providing the TDS, and wherein the TDS data included in each of the at least one sub AD structure field is different; and establishing a connection with the second device based on a wireless communication related to the TDS data.

2. The method of claim 1, wherein the at least one sub AD structure field is a length type value (LTV) field.

3. The method of claim 2, wherein the type of the TDS data includes at least one of manufacturer-specific data provided from a manufacturer of the first device, a unique identifier for identifying a service, a transmission (Tx) power representing power for transmitting the advertising packet, a first device name, a device image icon representing an image for identifying the first device, or a device image icon URL representing an address for receiving the device image icon.

4. The method of claim 2, wherein each of the at least one sub AD structure field comprises (i) a length field, (ii) a data type field representing a type of the TDS data included in a sub AD structure and (iii) a data field including the TDS data.

5. The method of claim 1, further comprising:
activating the wireless communication when the wireless communication is inactivated.

6. The method of claim 5, wherein the wireless communication is one of a Bluetooth basic rate/enhanced data rate (BR/EDR), Wi-Fi, Wi-Fi direct, near field communication (NFC), or WiGig.

7. The method of claim 1, wherein the connection with the second device is established based on a distance between the first device and the second device being within a specific distance.

8. A method for a second device to be connected to a first device in a wireless communication system, the method comprising:
receiving, from the first device, an advertising packet for providing a transport discovery service (TDS),
wherein the advertising packet comprises at least one advertising (AD) structure field,
wherein each of the at least one AD structure field comprises (i) a first length field, (ii) an AD type field representing a type of data included in an AD data field and (iii) the AD data field including the data,
wherein, based on the AD type field being set to represent the TDS, the AD structure field comprising the AD type field comprises at least one sub AD structure field,
wherein each of the at least one sub AD structure field comprises TDS data for providing the TDS, and
wherein the TDS data included in each of the at least one sub AD structure field is different; and
establishing a connection with the first device based on a wireless communication related to the TDS data.

9. The method of claim 8, wherein the at least one sub AD structure field is a length type value (LTV) field.

10. The method of claim 9, wherein each of the at least one sub AD structure field comprises (i) a length field, (ii) a data type field representing a type of the TDS data included in a sub AD structure and (iii) a data field including the TDS data.

11. The method of claim 10, wherein the type of the TDS data includes at least one of manufacturer-specific data provided from a manufacturer of the first device, a unique identifier for identifying a service, a transmission (Tx) power representing power for transmitting the advertising packet, a first device name, a device image icon representing an image for identifying the first device, or a device image icon URL representing an address for receiving the device image icon.

12. The method of claim 11, wherein the connection with the first device is established based on a distance between the first device and the second device being within a specific distance.

13. The method of claim 8, further comprising:
activating the wireless communication when the wireless communication is inactivated.

14. The method of claim 13, wherein the wireless communication is one of a Bluetooth basic rate/enhanced data rate (BR/EDR), Wi-Fi, Wi-Fi direct, near field communication (NFC), or WiGig.

15. A first device for establishing a connection with a second device in a wireless communication system, the device comprising:
a transmitter;
a receiver; and
a processor functionally connected to the transmitter and the receiver,
wherein the processor configured to:
perform a procedure for setting an advertising packet for providing a transport discovery service (TDS);
control the transmitter to transmit, to the second device, the set advertising packet,
wherein the advertising packet comprises at least one advertising (AD) structure field,
wherein each of the at least one AD structure field comprises (i) a length field, (ii) an AD type field representing a type of data included in an AD data field and (iii) the AD data field including the data,
wherein, based on the AD type field being set to represent the TDS, the AD structure field comprises at least one sub AD structure field,
wherein each of the at least one sub AD structure field comprises TDS data for providing the TDS, and
wherein the TDS data included in each of the at least one sub AD structure field is different; and
establish a connection with the second device based on a wireless communication related to the TDS data.

* * * * *